(12) United States Patent
Nagumo

(10) Patent No.: US 7,924,304 B2
(45) Date of Patent: Apr. 12, 2011

(54) LIGHT-EMITTING ELEMENT ARRAY, DRIVE CONTROLLING DEVICE, RECORDING HEAD, AND IMAGE FORMING DEVICE

(75) Inventor: Akira Nagumo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 12/471,756

(22) Filed: May 26, 2009

(65) Prior Publication Data

US 2009/0295901 A1 Dec. 3, 2009

(30) Foreign Application Priority Data

May 27, 2008 (JP) ................................. 2008-138736

(51) Int. Cl.
*B41J 2/45* (2006.01)
(52) U.S. Cl. ...................................................... 347/238
(58) Field of Classification Search .................. 347/237, 347/238, 247
See application file for complete search history.

(56) References Cited

U.S. PATENT DOCUMENTS

| 5,864,253 | A  | * | 1/1999 | Katakura et al. | ............... 327/297 |
| 6,703,790 | B2 | * | 3/2004 | Ohno | ......................... 315/169.3 |
| 2008/0079025 | A1 | * | 4/2008 | Inoue | ............................ 257/205 |
| 2008/0218287 | A1 | * | 9/2008 | Takagi | ........................ 333/17.3 |

FOREIGN PATENT DOCUMENTS

| JP | 01-214081 | A |   | 8/1989 |
| JP | 07-058382 | A |   | 3/1995 |
| JP | A-11-208020 |   |   | 8/1999 |
| JP | A-2001-026136 |   |   | 1/2001 |
| JP | 2006-059907 | A |   | 3/2006 |
| JP | 2007-081081 | A |   | 3/2007 |
| JP | 2008044148 | A | * | 2/2008 |

* cited by examiner

*Primary Examiner* — Hai C Pham
(74) *Attorney, Agent, or Firm* — Posz Law Group, PLC

(57) ABSTRACT

A light-emitting element array includes: a resistor connected at a first end to a driving unit; and a plurality of light-emitting elements, each of the plurality of light-emitting elements including a three-terminal switching element having a first terminal, a second terminal, and a third terminal, the first terminal in each of the plurality of light-emitting elements being connected to a second end of the resistor, the second terminal in each of the plurality of light-emitting elements being connected to ground, and the third terminal in each of the plurality of light-emitting elements being connected to a control circuit.

25 Claims, 16 Drawing Sheets

Fig. 7
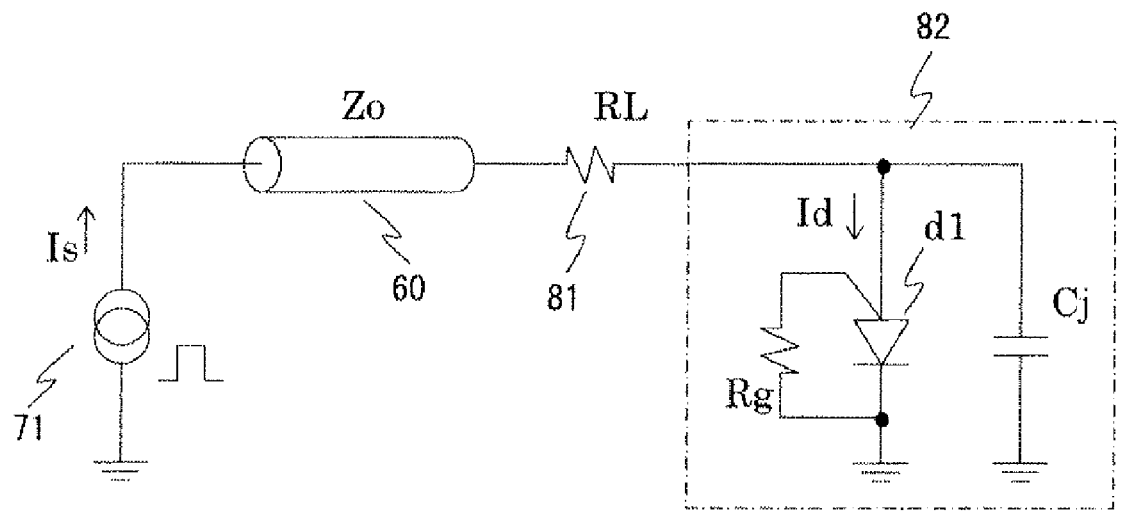
Fig. 8A
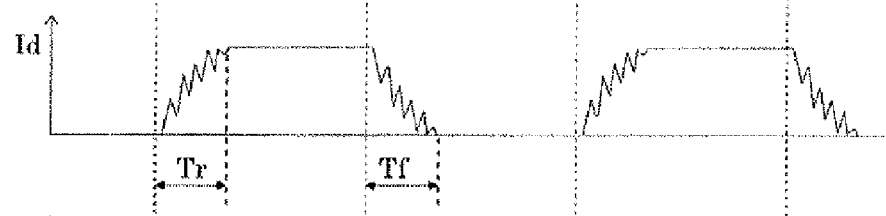
Fig. 8B
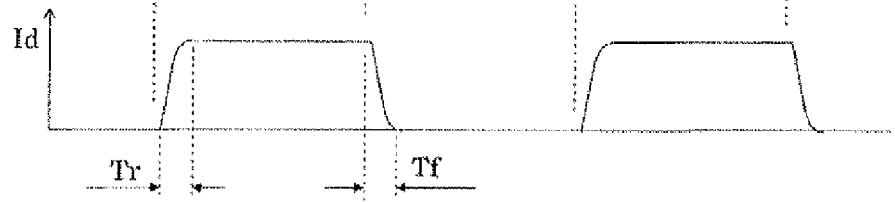
Fig. 8C

Fig. 15
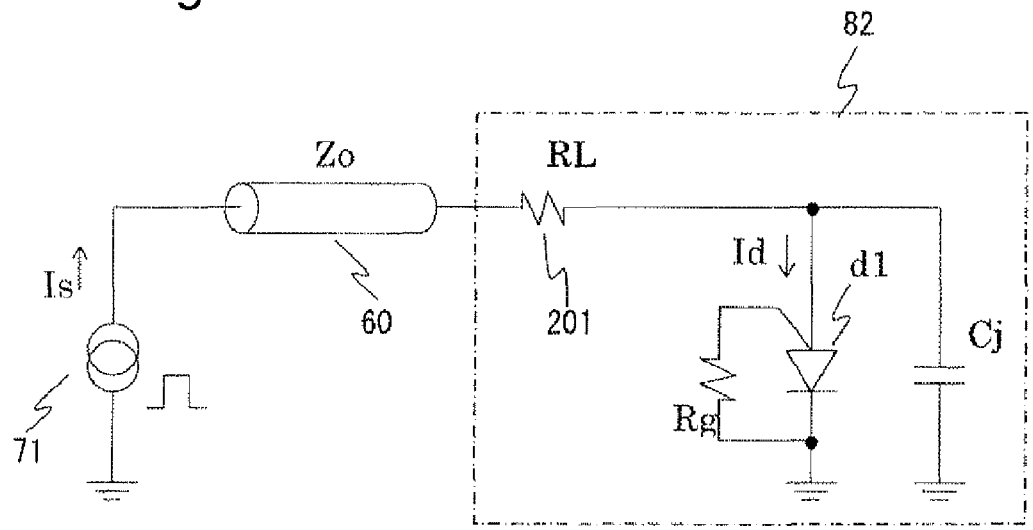
Fig. 16A
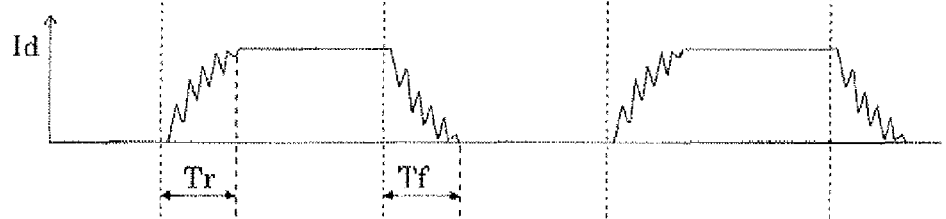
Fig. 16B
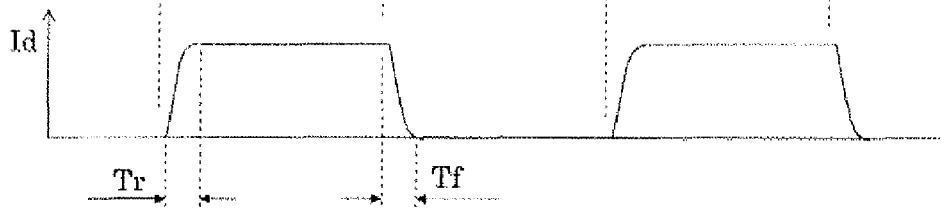
Fig. 16C

LIGHT-EMITTING ELEMENT ARRAY, DRIVE CONTROLLING DEVICE, RECORDING HEAD, AND IMAGE FORMING DEVICE

CROSS REFERENCE TO RELATED APPLICATION

The present application is related to, claims priority from and incorporates by reference Japanese Patent Application No. 2008-138736, filed on May 27, 2008.

TECHNICAL FIELD

The present invention relates to a light-emitting element array that arranges a plurality of light-emitting elements, a drive controlling device for driving (or activating) a light-emitting element, a recording head that has the light-emitting element, and an image forming device that has the recording head.

BACKGROUND

In a conventional image forming device, e.g. an electrophotographic printer, an electrostatic latent image is formed by selectively carrying out light irradiation to a charged photoconductor drum according to print information, a toner image is formed by making a toner adhere to the electrostatic latent image to develop, and the toner image is transferred and fused to a sheet of paper. The electrophotographic printer like this is known for using a light-emitting thyristor as a luminous source rather than a light-emitting diode (LED).

When an LED is used as a luminous source, a drive circuit and a light-emitting element are set so as to correspond to one-to-one, and a light-emitting and non-light-emitting state is switched according to whether electric current is sent or not directly between an anode terminal and a cathode terminal. On the other hand, when a light-emitting thyristor is used, the drive circuit and the light-emitting element are set to correspond to one to N (where N is a positive integer), the element to emit light is designated by using a gate terminal and the light-emitting power is controlled by electric current that flows between an anode terminal and a cathode terminal. Also, the drive circuit and the light-emitting element mentioned above are configured as different substrate units, and both are electrically connected by a connecting cable. Japanese laid-open patent application number 2007-81081, for example, discloses an image forming device using a light-emitting thyristor in this manner.

However, although light-emitting power is given by the electric current that flows between an anode terminal and a cathode terminal when a light-emitting thyristor is used as a light-emitting element, a problem can occur since a drive circuit and a light-emitting element are configured as different substrate units and both of them are electrically connected each other using a connecting cable. When the connecting cable is long, signal reflection occurs in multiplex between the drive circuit and the light-emitting element, the rise time and fall time of a driving current wave increases, and a control that switches a light-emitting element at high speed cannot be performed.

An object of the present invention is to provide a light-emitting element array, a drive controlling device, a recording head, and an image forming device that shorten a rise time of a driving current that drives a light-emitting element, and makes it possible to switch the light-emitting element at high speed.

SUMMARY

In order to resolve the above mentioned problems, a light-emitting element array according to the disclosed embodiments includes a plurality of light-emitting elements each including a switch element, a driving unit configured to drive the plurality of light-emitting elements to emit light, and a control circuit configured to control printing operations; the switch elements includes first, second and third terminals, the first terminal being connected to the driving unit via a connecting member, the second terminal being connected to ground, and the third terminal being connected to the control circuit, and a resistor arranged between the first terminal and the connecting member.

In addition, a drive controlling circuit according to the disclosed embodiments includes a switch element included in a light-emitting element, a driving unit configured to provide a driving current to the light-emitting element, the driving unit being connected to the light-emitting element via a connecting member, a control circuit configured to control the light-emitting element to emit light, and a resistor; the switch element includes first, second and third terminals, the first terminal being connected to the driving unit via the connecting member, the second terminal being connected to ground, and the third terminal being connected to the control circuit; the resistor is arranged between the first terminal and the connecting member, and the resistor being provided in the control circuit.

In addition, a recording head according to the disclosed embodiments includes a plurality of light-emitting elements, each of the plurality of light-emitting elements including a switch element having first, second and third terminals, each of the plurality of light-emitting elements being controlled by a driving unit connected via a connecting member, a control circuit configured to provide a control signal at an output terminal, and a resistor; the first terminal is connected to the driving unit via the connecting member, the second terminal is connected to ground, the third terminal is connected to the output terminal of the control circuit, and the resistor is arranged between the first terminal and the connecting member.

In addition, an image forming device according to the disclosed embodiments includes a plurality of light-emitting elements, each of the plurality of light-emitting elements including a switch element, each of the plurality of light-emitting elements being controlled by a driving unit connected via a connecting member, and a resistor arranged between the plurality of light-emitting elements and the connecting member; each switch element includes a first terminal connected to the driving unit via the connecting member and the resistor, a second terminal connected to ground, and a third terminal connected to a control circuit.

According to the present invention that has the configuration mentioned above, since a resistor is arranged between the first terminal of the three-terminal switch of the light-emitting element and a connecting member, a signal reflection does not occur between the driving unit and the light-emitting element at the time of rising, and it becomes possible to switch in a short rise time.

BRIEF DESCRIPTION OF THE DRAWINGS

FIG. 7 is a circuit diagram illustrating an equivalent circuit model of a light-emitting thyristor according to a first disclosed embodiment.

FIGS. 8A-8C are time diagrams illustrating a driving current waveform to a light-emitting thyristor according to a first disclosed embodiment.

FIG. 15 is a circuit diagram illustrating an equivalent circuit model of a light-emitting thyristor according to a second disclosed embodiment.

FIGS. 16A-16C are time diagrams illustrating a driving current waveform to a light-emitting thyristor according to a second disclosed embodiment.

DETAILED DESCRIPTION

Embodiments of the present invention are explained hereafter with reference to the drawings. Further, the present invention is not limited to the descriptions described below, but various changes may be made without departing from the scope of the invention.

Moreover, the instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued. It is further understood that the use of relational terms such as first and second, and the like, if any, are used solely to distinguish one from another entity, item, or action without necessarily requiring or implying any actual such relationship or order between such entities, items or actions.

It is noted that some embodiments may include a plurality of processes or steps, which can be performed in any order, unless expressly and necessarily limited to a particular order; i.e., processes or steps that are not so limited may be performed in any order. Some of the inventive functionality and some of the inventive principles when implemented, may be supported with or in software or integrated circuits (ICs), such as a digital signal processor and software therefore, and/or application specific ICs, or a combination thereof.

It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs will be limited to the essentials with respect to the principles and concepts used by the exemplary embodiments.

Figure 1:
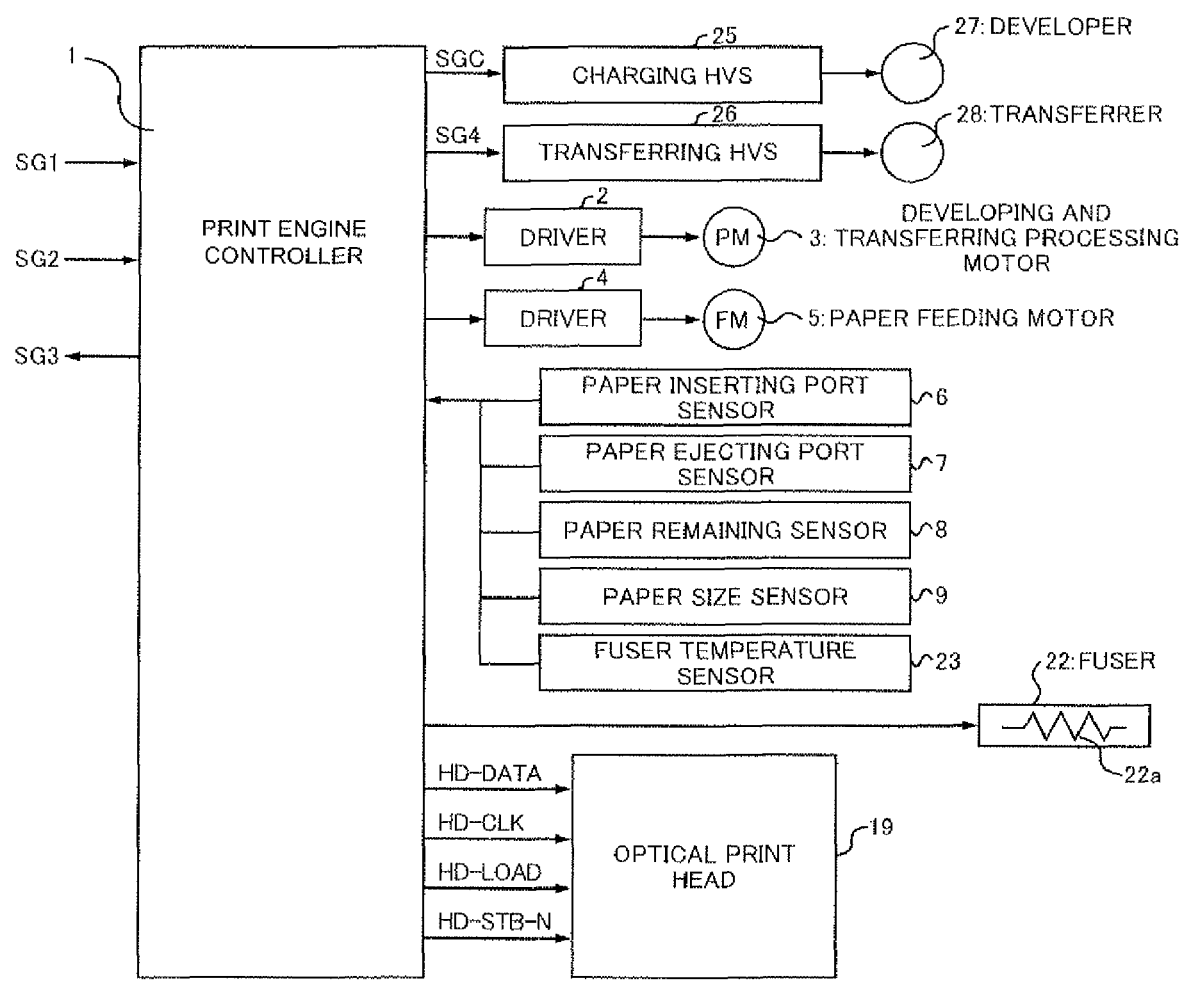
FIG. 1 is a block diagram illustrating an electrophotographic printer related to the present invention.
Figure 2:
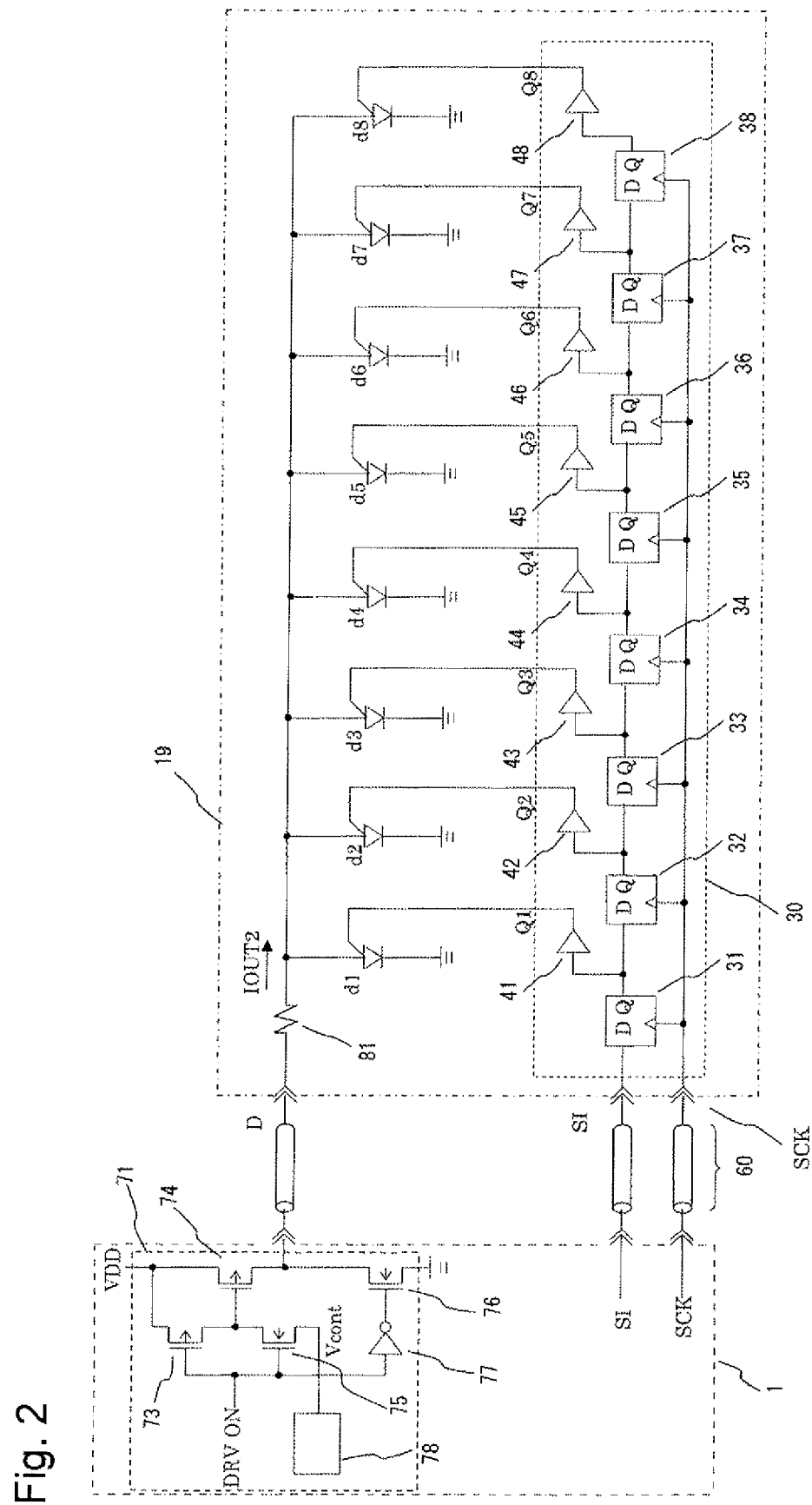
FIG. 2 is a circuit diagram illustrating an optical print head and a controller according to a first disclosed embodiment.

Hereinafter, an embodiment related to the present invention is described using drawings. FIG. 1 is a block diagram illustrating an electrophotographic printer related to the present invention. FIG. 2 is a circuit diagram illustrating an optical print head and a controller of an embodiment 1. In addition, a same code is assigned to an element common to each drawing. In each embodiment described below, an electrophotographic printer is described as an example of an image forming device.

First Embodiment

FIG. 1 is a block diagram illustrating an electrophotographic printer related to the present invention. As shown in FIG. 1, a print engine controller 1 is provided that includes a microprocessor, a read-only memory (ROM), a random-access memory (RAM), an input/output port, a timer, etc. It is arranged inside of a printing unit of a printer, carries out a sequence control of the whole printer with a control signal SG1 from an image processing unit as an upper controller (not shown), and a video signal SG2 (i.e., a one-dimensional arrangement of dot map data) etc., and performs a print operation. In other words, the print engine controller 1 is configured to control printing operations.

When a control signal SG1 is received as a print order, the print engine controller 1 initially detects whether or not a fuser 22 that is installed in a heater 22a is at a usable temperature range using a fuser temperature sensor 23. When the heater 22a is not in the desired temperature range, it is energized, causing the fuser 22 to be heated up to a usable temperature. Next, a developing and transferring processing motor (PM) 3 is rotated via a driver 2, a charging high voltage supply (charging HVS) 25 is simultaneously set to "on" based on a charge signal SGC, so as to charge a developer 27.

Then, the existence and size of a set sheet of paper (not shown) are detected by a paper remaining sensor 8 and a paper size sensor 9, and a paper feeding operation that is suitable for the sheet of paper is started. Here, the paper feeding motor (FM) 5 can be bi-directionally rotated via the driver 4. Normally, the motor 5 is reversed first, and a predetermined amount of the set sheets of paper is sent until a paper inserting port sensor 6 detects the sheets. Then, the motor 5 is rotated in a regular direction and feeds the sheet of paper into a printing mechanism inside the printer.

When a sheet of paper reaches a location where it can be printed, the print engine controller 1 transmits a timing signal SG3 (including a horizontal scanning synchronizing signal and a vertical scanning synchronizing signal) to the upper controller, and receives a video signal SG2 from the upper controller. The video signal SG2, which is edited at each page in the upper controller and is received by the print engine controller 1, is forwarded to an optical print head (a recording head) 19 as a print data signal HD-DATA. The optical print head 19 arranges a plurality of light-emitting thyristors on a line, which are each respectively set for printing one dot (i.e., pixel).

Transmission and reception of the video signal SG2 are performed for every printing line. The information that is eventually printed by the optical print head 19 is latently imaged as a dot rising electric potential on a photoconductor drum (not shown) charged in negative potential. And in a developer 27, toner for image forming charged in negative potential is attracted to the dot that is latently imaged by an electric attraction, and so a toner image is formed.

After that, the toner image is sent to a transferrer 28, while a transferring high voltage supply (transferring HVS) 26 is set to ON to a positive potential by a transfer signal SG4. The transferrer 28 then transfers the toner image onto the sheet of paper, which passes through and between the photoconductor drum and the transferrer 28. The sheet of paper that the toner image was transferred to is fed in contact with the fuser 22 (which includes a heater 22a) and the toner image is fused to the sheet of paper with the heat of the fuser 22. The sheet of paper that the toner image is fused to is then fed through a paper ejecting port sensor 7 from the printing mechanism of the printer, and is ejected to outside of the printer.

Based on detection by the paper size sensor 9 and the paper inserting port sensor 6, the print engine controller 1 applies a voltage from the transferring HVS 26 to the transferrer 28 only while the sheet of paper is passing through the transferrer 28. And when the printing is completed and the sheet of paper passes the paper ejecting port sensor 7, the application of the voltage to the developer 27 by the charging HVS 25 is ended, and the rotation of the developing and transferring processing motor 3 is stopped at the same time. This operation is repeated as necessary for additional printing operations.

Next, an optical print head 19 is described. In the present disclosed embodiment, the optical print head 19 uses a light-emitting thyristor as a light-emitting element. A light-emitting thyristor has a similar light-emitting mechanism as an LED or a laser diode (LD), and makes a PNPN structure from a compound semiconductor (e.g., GaAs, GaP, AlGaAs, InGaAsP, InGaAlAs etc.). It is put in practical use as a thyristor and a silicon controlled rectifier (SCR) using silicon.

Next, a configuration of an optical print head is described with reference to FIG. 2. In addition, although it is described that the light-emitting elements are only eight pieces in order to simplify the description in FIG. 2, this is by way of example only. An optical print head that can print in a resolution of 600 dots per inch on the A4 size paper, for example, would employ 4,992 light-emitting elements are, and a total of 4,992 steps of circuit elements in a configuration of FIG. 2 would be aligned.

As shown in FIG. 2, an optical print head 19 is connected with a print engine controller 1 via a connecting cable 60. The circuit symbol illustrated as "->>-" in the figure shows a connector. A resistor 81 is connected between a D input terminal of the optical print head 19 and an anode terminal of a light-emitting thyristor d1 etc. When a characteristic impedance of the connecting cable 60 is Zo, and a resistance value of the resistor 81 is RL, the resistance value RL is set up to become:

$$RL = Zo \quad (1)$$

Or when some ripple waveforms are acceptable in the transition state of a driving current waveform of the light-emitting thyristor, it may be set up to become:

$$\frac{Zo}{2} \leq RL \leq (2 \times Zo) \quad (2)$$

The optical print head 19 is described below. Reference numeral 30 surrounded with a broken line represents a shift register (as a control circuit), reference numerals 31-38 represent flip-flop circuits, and reference numerals 41-48 represent buffer circuits. Although in the disclosed embodiment the shift register 30 is created using a publicly known complementary metal oxide semiconductor (CMOS) structure on a silicon wafer base material, in alternate embodiments it can also be manufactured using a publicly known thin film transistor (TFT) technology on a glass substrate.

Elements d1-d8 are light-emitting thyristors, each equipped with three terminals of an anode, a cathode, and a gate. The optical print head 19 is equipped with three input signal terminals: D, SI, and SCK. SI is a serial data input terminal to the shift register 30; SCK is a clock terminal of the shift register 30; and D is a data terminal that is connected with the anode terminal of the light-emitting thyristor and supplies an anode current when the light-emitting thyristor is driven.

A serial data terminal SI is connected with a D input terminal of a flip-flop 31. A Q output terminal of the flip-flop 31 is connected with an input terminal of a buffer circuit 41 and with a D input terminal of a flip-flop 32 of the next step. The output of the buffer circuit 41 turns into a Q1 output of the shift register 30, and is connected with a gate terminal of a light-emitting thyristor d1. The other output terminals Q2-Q8 of the shift register 30 are configured in a similar manner, as can be seen in FIG. 2. The clock terminal SCK of the shift register 30 is connected with the clock terminal of the flip-flops 31-38, and a data terminal D of the optical print head 19 is collectively connected with the anodes of the light-emitting thyristors d1-d8. A cathode terminal of each of the light-emitting thyristors d1-d8 is connected to a ground.

In the print engine controller 1, positive channel metal oxide semiconductor (PMOS) transistors 73 and 74, negative channel metal oxide semiconductor (NMOS) transistors 75 and 76, an inverter circuit 77, and the control voltage generation circuit (CVGC) 78 are set as a driving output circuit (i.e., a driving unit) 71. A source of the PMOS transistor 73 is connected to a power source VDD, and its drain is connected to both a gate terminal of the PMOS transistor 74 and a drain terminal of the NMOS transistor 75. A source of the NMOS transistor 75 is connected with a control voltage Vcont electric potential that is an output from the CVGC 78.

A DRV-ON signal is a signal that orders the actual light-emitting/non-light-emitting timing of a light-emitting thyristor, and is connected with the gate terminals of the PMOS transistor 73 and the NMOS transistor 75, and an input of an inverter circuit 77. A source of the PMOS transistor 74 is connected to the power source VDD, and the drain terminal of the PMOS transistor 74 is connected to both a drain terminal of the NMOS transistor 76 and the D terminal of the optical print head 19. Also, the source terminal of the NMOS transistor 76 is connected with a ground, and its gate terminal is connected with the output of the inverter circuit 77.

If the DRV-ON signal is at a Low level, the following will occur. The output of the inverter circuit 77 becomes a High level, and the NMOS transistor 76 turns "on;" the NMOS transistor 75 is set in an off-state; the PMOS transistor 73 is set in an on-state; the voltage between the gate and the source of PMOS transistor 74 becomes approximately zero volts; and the transistor 74 turns off. As a result, an output of the data terminal D of the optical print head 19 becomes approximately zero volts, an electric current IOUT2 that flows into each anode terminal of the light-emitting thyristors becomes zero, and all of the light-emitting thyristors d1-d8 enter a non-light-emitting state.

If the DRV-ON signal is at a High level, the following will occur. The output of the inverter circuit 77 becomes a Low level, and the NMOS transistor 76 turns "off;" the NMOS transistor 75 is set in an on-state; the PMOS transistor 73 is set in an off-state; and the gate electric potential of the PMOS transistor 74 becomes approximately equal to the Vcont electric potential shown in FIG. 2, causing a drain current to flow into the PMOS transistor 74. As a result, an electric current IOUT2 that flows from the data terminal D of the optical print head 19 into the anode terminal of a light-emitting thyristor can flow, and only the element that carries out an emission command becomes a light-emitting state selectively from among the light-emitting thyristors d1-d8.

The electric potential of the output Vcont of the CVGC 78 is set up to operate the PMOS transistor 74 in a saturation region, and the drain current Id at this time can be determined according to the following equation:

$$Id = K \times \left(\frac{W}{L}\right) \times (Vgs - Vt)^2, \quad (3)$$

where K is a constant, W is a gate width of the PMOS transistor 74, L is a gate length, Vgs is the voltage between a gate and a source, and Vt is a threshold voltage. In addition, the voltage between a gate and a source Vgs at this time is equal to the electric potential difference between the power source potential VDD and the control voltage Vcont, i.e.:

$$Vgs = VDD - Vcont. \quad (4)$$

In this way, the drain current Id of the PMOS transistor 74, i.e., the driving current IOUT2 of the light-emitting thyristor, can be set to a desired value by adjusting the electric potential of the control voltage Vcont.

In addition, with respect to the PMOS transistor 74 mentioned above, the MOS transistor that operates in a saturation region can maintain a drain current value at a predetermined value by appropriately setting up an element size even if the drain electric potential changes somewhat. Such characteristics are publicly known as a constant current characteristic of a MOS transistor, and in order to obtain good characteristics, while setting up the gate length mentioned above more greatly, the voltage between a gate and a source Vgs is set to be small.

Figure 3A:
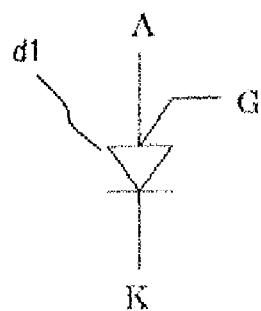
FIGS. 3A-3D are views illustrating the light-emitting thyristor according to a first disclosed embodiment.

FIGS. 3A-3D are views illustrating the configuration of the light-emitting thyristor shown in FIG. 2. FIG. 3A illustrates a circuit symbol for a thyristor, showing that it is equipped with three terminals, an anode terminal A, a cathode terminal K, and a gate terminal G.

Figure 3B:
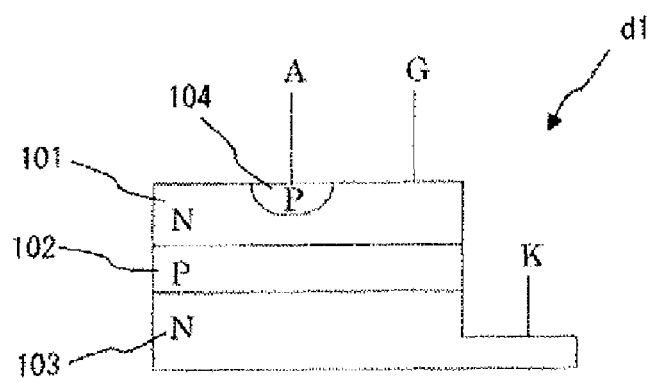

FIG. 3B is a view illustrating a section structure of the light-emitting thyristor shown in FIG. 3A. The light-emitting thyristor shown in the present view is created using a GaAs wafer base material and growing a predetermined crystal epitaxially onto an upper layer of the base material mentioned above by metal organic-chemical vapor deposition (MO-CVD) method that is publicly known.

Initially, after epitaxially growing a predetermined buffer layer and a sacrifice layer (not shown), a wafer is configured that consists of a three-layer structure of NPN each of which is sequentially laminated. This three-layer structure includes an N-type layer 103 which is an N-type impurity is contained in an AlGaAs base material; a P-type layer 102 on top of the N-type layer, containing a P-type impurity; and an N-type layer 101 on top of the P-type layer 102 that has the N-type impurity is contained in it. Subsequently, a P-type impurity region 104 is selectively formed in a part of the top N-type layer 101 by a photolithographic process. Isolation may be achieved by forming a trench using a dry etching method. A part of the N-type region 103 that is the undermost layer of the thyristor is exposed during the etching mentioned above, and a metallic wiring is formed in the N-type region 103 to form a cathode electrode K. At the same time, an anode electrode A and a gate electrode G are respectively formed in the P-type region 104 and the N-type region 101.

Figure 3C:
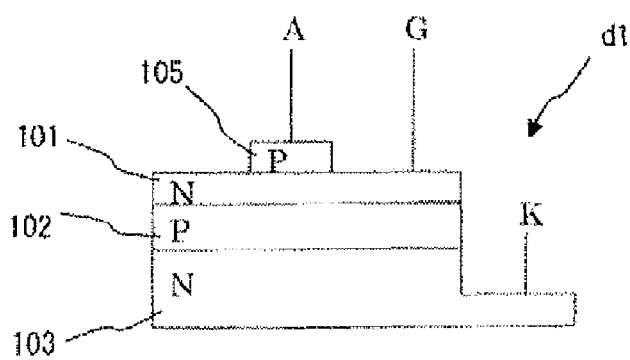

FIG. 3C illustrates another form of the light-emitting thyristor. In this configuration, it is created using a GaAs wafer base material and growing a predetermined crystal epitaxially as an upper layer onto the base material mentioned above by a MO-CVD method. Initially, after growing a predetermined buffer layer and a sacrifice layer (not shown) epitaxially, a wafer is configured having a four-layer structure of PNPN that includes four layers sequentially laminated. These are: an N-type layer 103 comprising an N-type impurity contained in the AlGaAs base material; a P-type layer 102 that is formed over the N-type layer 103 and contains a P-type impurity; an N-type layer 101 formed over the P-type layer 102, having the N-type impurity is contained in it; and a P-type layer 105 that is formed over the N-type layer 101 and contains the P-type impurity.

Furthermore, isolation can be performed with forming a trench by the dry etching method. A part of the N-type region 103 that is the undermost layer of a light-emitting thyristor is exposed in process of the etching mentioned above, and a metallic wiring is formed in the region 103 to form a cathode electrode K. Similarly, a part of the P-type region 105 as the top layer is exposed, and a metallic wiring is formed in the range 105 to form an anode electrode A. At the same time, a gate electrode G is formed in the N-type region 101.

Figure 3D:
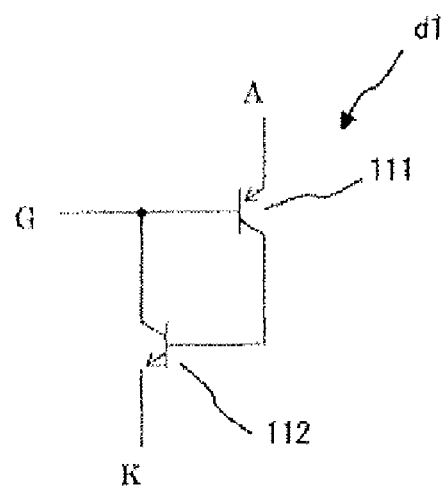

FIG. 3D illustrates a circuit diagram of the light-emitting thyristor drawn so as to contrast FIGS. 3B and 3C. A light-emitting thyristor consists of a PNP transistor 111 and an NPN transistor 112, an emitter of the PNP transistor 111 corresponds to an anode terminal A of the thyristor, the base of the PNP transistor 111 corresponds to a gate terminal G of the thyristor, and the terminal is also connected with a collector of the NPN transistor 112. Also, a collector of the PNP transistor 111 is connected with the base of the NPN transistor 112, and an emitter of the NPN transistor 112 corresponds to a cathode terminal K of the thyristor.

The thyristor element mentioned above is adhered with an integrated circuit (IC) wafer that integrates shift registers using an epitaxial film bonding method that is disclosed in the Japanese laid-open application 2007-81081, for example, and it is wired together between connecting terminals of the two using the photolithographic method. Furthermore, the composite chip is formed, that consists of a light-emitting element and a driving element by separating into a plurality of chips using a dicing method that is publicly known.

Figure 4:
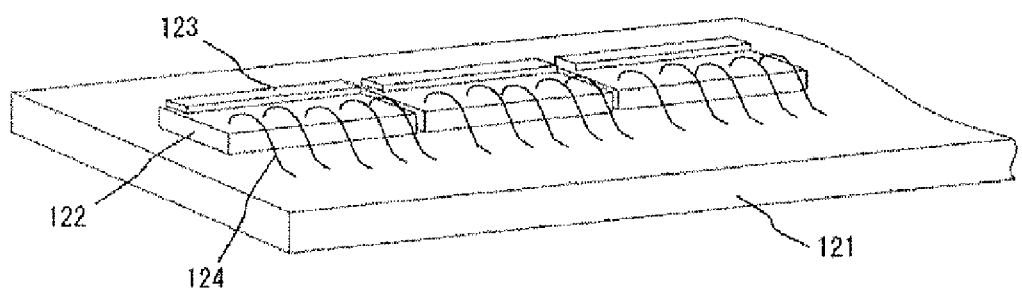
FIG. 4 is a perspective view of a printed circuit board unit of an optical print head according to disclosed embodiments.

FIG. 4 is a perspective view of the printed circuit board unit of an optical print head that is configured by aligning the light-emitting element and driving element composite chip mentioned above on a printed circuit board. As shown in FIG. 4, a printed wiring board 121 has an IC chip 122 formed on that the shift registers are integrated in; and a light-emitting thyristor sequence 123 is arranged on top of the IC chip 122.

Bonding wires 124 then connect each terminal of the shift register of the IC chip 122 and a wiring pad (not shown) on the printed wiring board 121.

Figure 5:
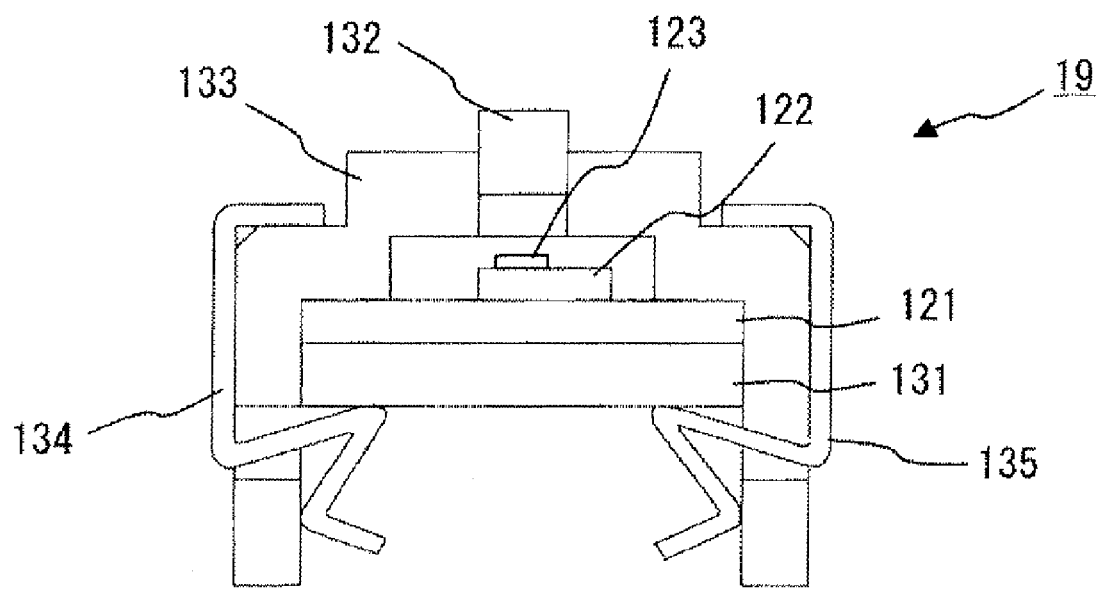
FIG. 5 is a sectional view illustrating a configuration of an optical print head according to disclosed embodiments.

FIG. 5 is a sectional view schematically illustrating a configuration of an optical print head. As illustrated in FIG. 5, the optical print head 19 consists of a base member 131, a printed wiring board 121 fixed on the base member 131, a rod lens array 132 that many pillar-shaped optical elements are aligned in, a holder 133 holding the rod lens array 132, and clamp members 134 and 135 that fix the printed wiring board 121, the base member 131 and the holder 133. As shown above in FIG. 4, the IC chip 122 that the shift registers are integrated in is formed on the printed wiring board 121, and the light-emitting thyristor sequence 123 is arranged on the IC chip 122.

Figure 6:
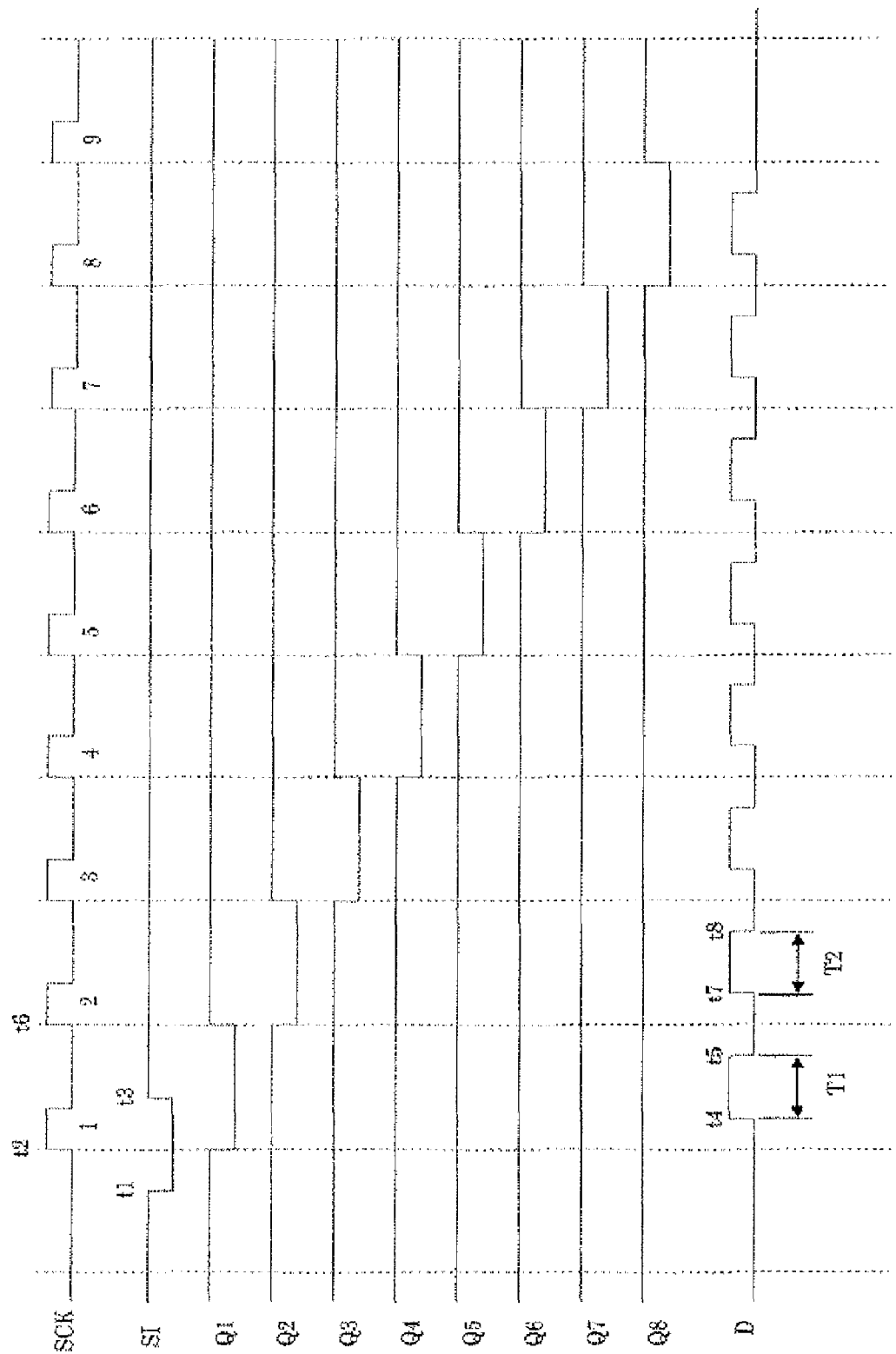
FIG. 6 is a time diagram illustrating an operation of an optical print head according to disclosed embodiments.

Next, an operation of the first disclosed embodiment is described. FIG. 6 is a timing diagram that illustrates the operation at the timing of driving an optical print head shown in FIG. 2. The present view illustrates the situation of one line scanning at the time of the print operation in a printer, and the operation when the light-emitting thyristors d1-d8 in FIG. 2 turn on one-by-one. In addition, although not shown in the present view, a preset processing of a shift register is performed as a preliminary operation when printer power is applied. In this processing, an SI terminal in FIG. 2 is set to a High level, and a clock pulse of the number corresponding to the number of steps of the shift register 30 is input into a clock terminal SCK. By doing this, all outputs of Q1-Q8 of the shift register 30 are set at the High level.

As shown in FIG. 2 and FIG. 6, before scanning one line, a shift data input terminal SI is set to a Low level at the time t1. Next, a first pulse of a clock signal SCK is input at time t2. When a SCK signal rises, the SI signal mentioned above is provided to a flip-flop circuit 31 of a first step of a shift register, and slightly after this, a first output Q1 of the flip-flop circuit 31 at the first step transits to the Low level. After the clock signal SCK rises, the shift data input terminal SI is again returned to the High level at the time t3.

When Q1 output becomes the Low level, the gate electric potential of the light-emitting thyristor d1 is reduced. Next, the signal of the data input terminal D is set to High at the time t4. This produces an electric potential difference between the anode and the gate of the light-emitting thyristor d1, and according to the trigger current by this, the light-emitting thyristor d1 turns on and enters a light-emitting state. Since the light-emitting state of the light-emitting thyristor d1 is mainly based on the electric current that flows between the anode and cathode, a voltage applied between the anode and cathode is set to zero in order to turn off the light-emitting thyristor d1 that has been turned on. For this reason, the electric potential of the data terminal D is set to Low at the time t5.

And as mentioned above, since a light-emitting power of the light-emitting thyristors d1-d8 is mainly based on the current value that flows between the anode and cathode, the driving current can be maintained at a predetermined value even if some element variations are caused on the voltage between the anode and the cathode at the time the light-emitting thyristor is in a light-emitting state, and a light-emitting power can be maintained at a predetermined value even if a supply voltage etc. change, by using a driving output circuit 71 that has a constant current characteristic as a driving source of the D terminal in FIG. 2.

In addition, in FIG. 6, although the data terminal D is set to a High level at the time t4 in order to make the light-emitting thyristor d1 emit light, and it is set to a Low level at the time t5 to make the light turn off when there is no need to make the light-emitting thyristor d1 emit light, the data input D may just be left in the Low level during the time from the time t4 to time t5. In this way, light-emitting/non-light-emitting state of the light-emitting thyristor d1 can be switched by a data input D value.

Next, the clock signal SCK rises at the time t6. Since the shift data input terminal SI is set to the High level at this time, the Q1 terminal output transits to the High level slightly late for this, and Q2 terminal output changes to the Low level. Next, the signal of the data input terminal D is set to High at the time t7. This causes an electric potential difference between an anode and a gate of the light-emitting thyristor d2, and the light-emitting thyristor d2 turns on and becomes a light-emitting state according to the trigger current by this. Since the light-emitting state of the light-emitting thyristor d2 is mainly based on a current value that flows between an anode and a cathode, the voltage that is applied between the anode and the cathode is set to zero in order to turn off the light-emitting thyristor d2 that is turned on. For this reason, the electric potential of the data terminal D is set to Low at the time t8.

As seen in the description mentioned above, only one output is set to the Low level one by one of each output of Q1, Q2, Q3, Q4, Q5, Q6, Q7, and Q8, for every rising of the clock signals SCK 1, 2, 3, 4, 5, 6, 7, and 8 shown in FIG. 6, and the other outputs are at the High level. For this reason, when the data signal D is the High level, only the corresponding output of Q1-Q8 being a Low level, from among the light-emitting thyristors d1-d8 connected to the terminal of Q1-Q8, is made to emit light selectively.

In the description mentioned above, in order to turn on the light-emitting thyristors d1-d8, it is necessary to put the electric potential difference that carries out bias in a forward direction between the anode and the gate of these elements and to just supply an anode current. In order to leave them in an off-state, it is sufficient to make the electric potential difference between the anode and the gate to be just below the voltage in the forward direction. It is also possible to set the electric potential difference to be zero, or to apply a voltage in a reverse direction.

The driving time T1 of the light-emitting thyristor d1 and the driving time T2 of the light-emitting thyristor d2 etc. may differ from each other, and even if a variation is caused in a light-emitting efficiency of the light-emitting thyristors d1-d8 etc., it is easy to change a driving current for every driving timing to control the driving times T1 and T2 etc. as different values so that a predetermined exposure energy quantity may be obtained by amending it.

FIG. 7 is a circuit diagram that is an equivalent-circuit modeled by choosing a light-emitting thyristor d1 represented from the circuits illustrated in FIG. 2. In FIG. 7, a driving output circuit 71 is replaced to a constant current source symbol from among the circuits illustrated in FIG. 2, the current value is set to Is, and a connecting cable 60 that connects between a print engine controller 1 and an optical print head 19 is illustrated as a transmission path that has a characteristic impedance Zo and a signal transfer delay time Td. In this exemplary embodiment, the resistance value of the resistor 81 is set to RL.

82 is a representative light-emitting thyristor d1 from among the light-emitting elements of an optical print head, and is equivalent-circuit-modeled. In order to make the light-emitting thyristor d1 into an on-state, a resistor Rg is connected between a gate and a cathode. In this way, a part of current component, from among an anode current Id that flows in from an anode terminal, flows into a ground as a gate current via the resistor Rg, and so the light-emitting thyristor d1 is turned into on-state by the gate current. Cj is a capacitor that represents the junction capacitance caused between the anode and the cathode of the light-emitting thyristor d1, d2, etc.

FIGS. 8A-8C are time diagrams that illustrate the driving current waveform to a light-emitting thyristor. FIG. 8A illustrates the waveform of the driving current Is from the driving output circuit 71 that is a signal source, and an on-time and an off-time are shown as Ton and Toff in the view. FIGS. 8B and 8C illustrate the waveforms of the driving current after passing through the connecting cable 60. In particular, FIG. 8B illustrates a conventional operation in which the driving current waveform of a light-emitting thyristor at the time of making the resistance value RL goes to zero. FIG. 8C illustrates the driving current waveform in the first disclosed embodiment.

In the connecting cable 60 mentioned above, when the cable length is set as L, and a signal propagation velocity in the cable as Vo, the signal transfer delay time Td of the cable is given according to the following equation:

$$Td = \frac{L}{Vo}, \qquad (5)$$

where the signal propagation velocity Vo is:

$$Vo = Co/\sqrt{\epsilon r}, \qquad (6)$$

where $\sqrt{\epsilon r}$ expresses a square root of a relative permittivity $\epsilon r$, Co is a speed of light in a vacuum and is:

$$Co \approx 3 \times 10^8 \text{ [m/s]}, \qquad (7)$$

and $\epsilon r$ is the relative permittivity of the insulating material used in the cable mentioned above. Based on this, the signal transfer delay time Td is set to:

$$Td = \frac{L}{Vo} = \left(\frac{L}{Co}\right) \times \sqrt{\epsilon r}. \qquad (8)$$

When the relative permittivity of a cable is set to 4 and a cable length to 1 m as a typical example, the signal transfer delay time Td is set to:

$$Td \approx 6.7 \text{ [nS]}. \qquad (9)$$

In a conventional circuit, as illustrated in FIG. 8B, when the driving source waveform Is rises, a driving signal reaches the light-emitting thyristor d1 after the delay time Td mentioned above, and the current waveform Id of the light-emitting thyristor d1 that is a driven element begins to rise. At this time, a part between the anode and the cathode of the light-emitting thyristor d1 operates equally as the capacitor Cj, causing a signal reflection by the element, and causing a reflected wave that goes through the connecting cable 60 in the direction to a driving signal source. The reflected wave is reflected by an internal impedance of the driving signal source (the impedance is infinite when it can be regarded as a constant current source), and causes reflection again through the connecting cable 60 in the direction to the optical print head 19. In this way, the current waveform is obtained, that rises in the rise time Tr, causing the signal reflection in multiplex between the driving signal source and a load (i.e., the light-emitting thyristor) via the connecting cable 60, and causing a ripple in a cycle of 2×Td.

As is obvious by comparing the waveform of FIG. 8A and the waveform of FIG. 8B, even if the rising of the driving signal source waveform is steep, the rise time Tr of the driving current waveform of the light-emitting thyristor d1 becomes long. Although a multiple reflection waveform reduces the reflected amount by going and coming back through the cable, when a reflected component disappears after, for example, 10 round trips, the rise time Tr of the driving signal becomes:

$$Tr = 2 \times Td \times 10 \approx 6.7 \times 20 = 134 \text{ [nS]}. \qquad (10)$$

This is similar to a fall time Tf for the in falling of the driving current of the light-emitting thyristor.

The rise time Tr of the driving signal is a large value compared with the rise time of a driving signal source, and the value is mainly decided by the propagation delay time of the connecting cable, i.e., the cable length. Therefore the cable length has to be shortened in order to raise the lighting switching speed of the optical print head. However, since the cable length is restrained by the situation of the parts arrangement in a printer, it is difficult to shorten it. This is especially, in a tandem color printer configured by sequentially arranging each color toner unit, such as black, yellow, magenta, and cyan. The cable length differs for each color, and it can be even one meter or more when it is long. As a result, since the rise time and the fall time of the driving current of the light-emitting thyristor increase, there is a problem that it cannot increase the switching speed of the optical print head using it.

In contrast with this, in the first disclosed embodiment, the resistor 81 is inserted in a data terminal of the optical print head 19 in series. FIG. 8C illustrates a waveform of the driving current of the light-emitting thyristor in a case of setting up the resistance value so that it may become RL=Zo when the characteristic impedance of the connecting cable 60 is set as Zo, and the resistance value of the resistor 81 as RL. In this case, a ripple waveform at the time of signal transition that is seen in FIG. 8B, and the phenomenon that the transition time increases are solved, and it turns out that it can switch in comparatively short rise time Tr and fall time Tf.

In the example mentioned above, it is set up to become:

$$RL = Zo \qquad (11)$$

where the resistance value of the resistor 81 is set as RL. A similar effect can be obtained by setting RL to be between twice Zo and half of Zo, as shown by the following equation:

$$\frac{Zo}{2} \leq RL \leq (2 \times Zo) \qquad (12)$$

where some ripple waveforms are acceptable in a transition state of the driving current waveform of the light-emitting thyristor.

As described above, according to the first disclosed embodiment, the driving output circuit 71 and a light-emitting element are configured as different substrate units, and both of them are electrically connected using the connecting cable 60. Furthermore, even when the connecting cable 60 is long, this configuration avoids the problem that the signal reflection occurs in multiplex between the driving output circuit 71 and the light-emitting element and that the rise time and the fall time of the driving current waveform increase. As a result, the switching control of the light-emitting element mentioned above can be performed at high speed.

Modification of First Embodiment

Figure 9:
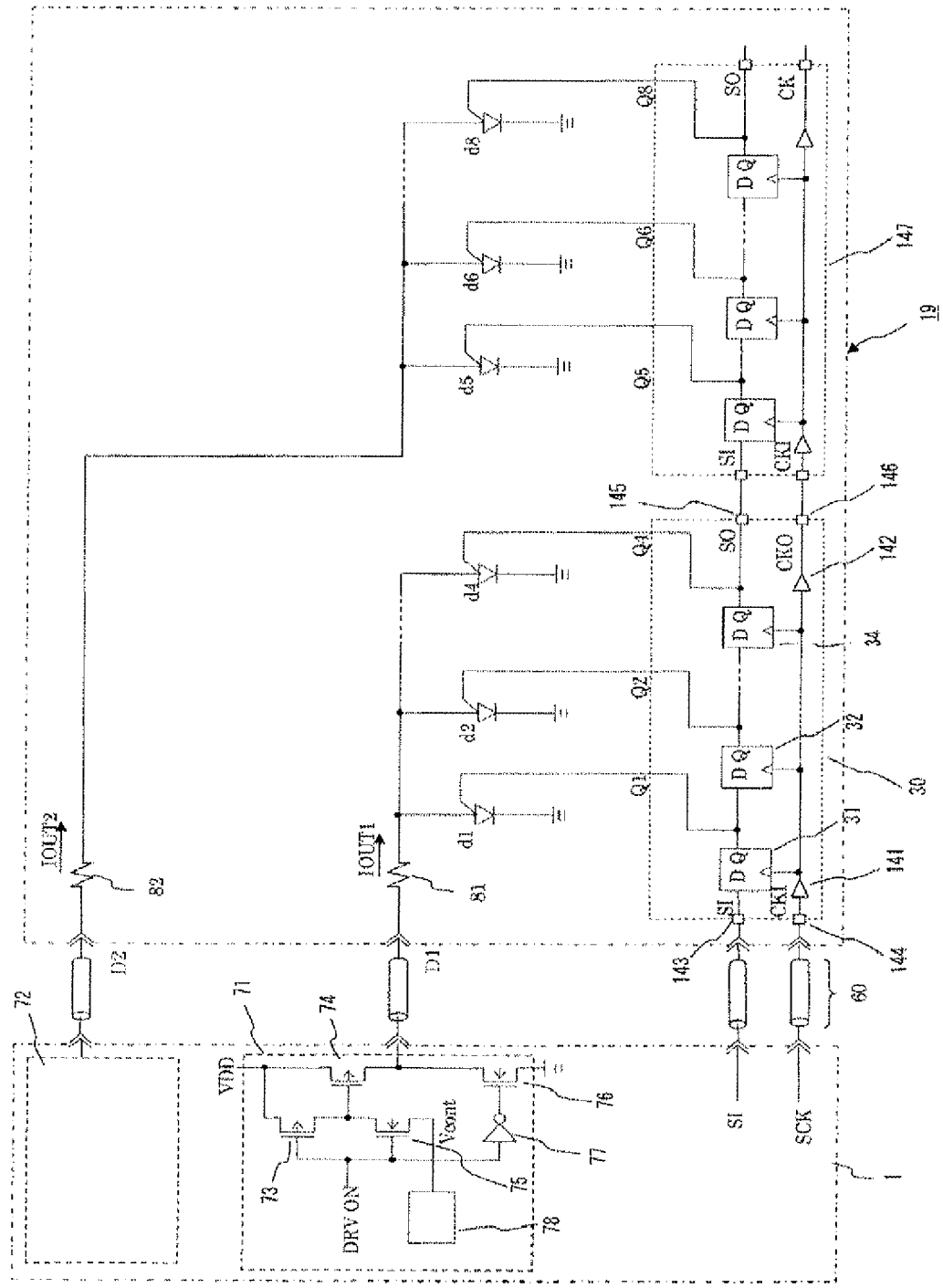
FIG. 9 is a circuit diagram illustrating an optical print head and a controller according to a modification of a first disclosed embodiment.

Next, a modification of the first described embodiment is described. This modification is to operate a plurality of thyristor chips in parallel used for an optical print head to try to perform a further high-speed operation. FIG. 9 is a circuit diagram illustrating the modification of the first disclosed embodiment. The present modification involves configuring the light-emitting thyristor used for an optical print head with a plurality of semiconductor chips. The chips in this embodiment operate in parallel in order to operate at high speed.

FIG. 9 illustrates an optical print head 19 and a print engine controller 1 of the modification, and a configuration of the circumference of them, and the light-emitting thyristor (d1-d8) is used as a light-emitting element. In addition, in FIG. 9, in order to simplify a description, only a part of the light-emitting thyristor is shown and the other parts are omitted. For example, in a print head that can print in a resolution of 600 dots per inch on A4 size paper, there are a total of 4992 light-emitting thyristors, and a total of 4,992 aligned steps of each circuit element that consists of a configuration of FIG. 9.

As shown in FIG. 9, a print engine controller 1 includes two driving output circuits 71 and 72 that have a similar configuration to the driving output circuit 71 of the first disclosed embodiment illustrated in FIG. 2. Although inside of the driving output circuit 72 is omitted, it has a similar configuration to the driving output circuit 71. Connecting cables 60 connect the optical print head 19 and the print engine controller 1. Elements 81 and 82 are resistors, and elements 30 and 147 each show a shift register (or shift register circuit). Although the shift register 30 is illustrated as being equipped with four output terminals (e.g., Q1-Q4), in an actual configuration as mentioned above, it will be equipped with 192 output terminals, and have a total 4,992 (=192×26) driving outputs by connecting 26 elements, that are a similar configuration to the shift register 30 mentioned above, in a cascade. This will enable it to perform a drive control of a total 4,992 pieces of the light-emitting thyristors by connecting gate terminals of the light-emitting thyristors corresponding to each of the driving outputs mentioned above.

Furthermore, as shown in FIG. 9, elements 31-34 are flip-flop circuits, elements 141 and 142 are buffer circuits, elements 143 and 144 are the input terminals of the shift register 30. The input terminal 143 shown as SI is connected with serial data signal SI, and is connected with a D terminal of the flip-flop circuit 31 via the terminal. Also, the input terminal 144 shown as CKI is a clock input terminal of the shift register 30. A serial clock signal SCK is inputted into the terminal, and the terminal is connected with an input of the buffer circuit 141. Also, an output terminal 145 shown as SO is a serial data output terminal of the shift register 30, and it is connected with Q output of the flip-flop circuit 34 via the buffer circuit (not shown).

Furthermore, the output terminal 146 shown as CKO is a serial clock output terminal of the shift register 30, and is connected with an output terminal of the buffer circuit 142. Also, the output of the buffer circuit 141 is connected with an input terminal of the buffer circuit 142, while being connected with a clock terminal of the flip-flop circuits 31-34. The output signal terminals from the shift register 30 (i.e., a serial data output SO, a serial clock output CKO) and the input terminals of the shift register 147 similarly equipped with the configuration (i.e., a serial data input SI, a serial clock input CKI), are mutually connected to each other via a wiring pattern of a printed wiring board (not shown) in the figure, e.g., a bonding wire, etc.

The light-emitting thyristors d1-d4 in FIG. 9 are designated and controlled by the shift register 30, and an anode terminal of each of the light-emitting thyristors d1-d4 is connected with a data terminal D1 of the anode driving output circuit 71 via a resistor 81. Similarly the light-emitting thyristors d5-d8 are designated and operated by the shift register 147, and the anode terminal of each of the light-emitting thyristors d5-d8 is connected with the data terminal D2 of the anode driving output circuit 72 via the resistor 82. The light-emitting thyristor sequence and the shift register that are not shown in this view are similarly connected to the corresponding anode driving output circuit, respectively.

As mentioned above, in the actual configuration, the shift registers 30 and 147, etc. are respectively equipped with output terminals 192, equipped with shift registers 26 similarly configured to the shift register 30 described above, and equipped with a group of light-emitting thyristor for every shift register. The anode terminals of each group are connected, and each terminal is connected to the anode driving output circuit mentioned above. An exposing processing is performed for one line with a printer by the anode driving output circuits, as shown above, that are 26 pieces operating in parallel.

Figure 10:
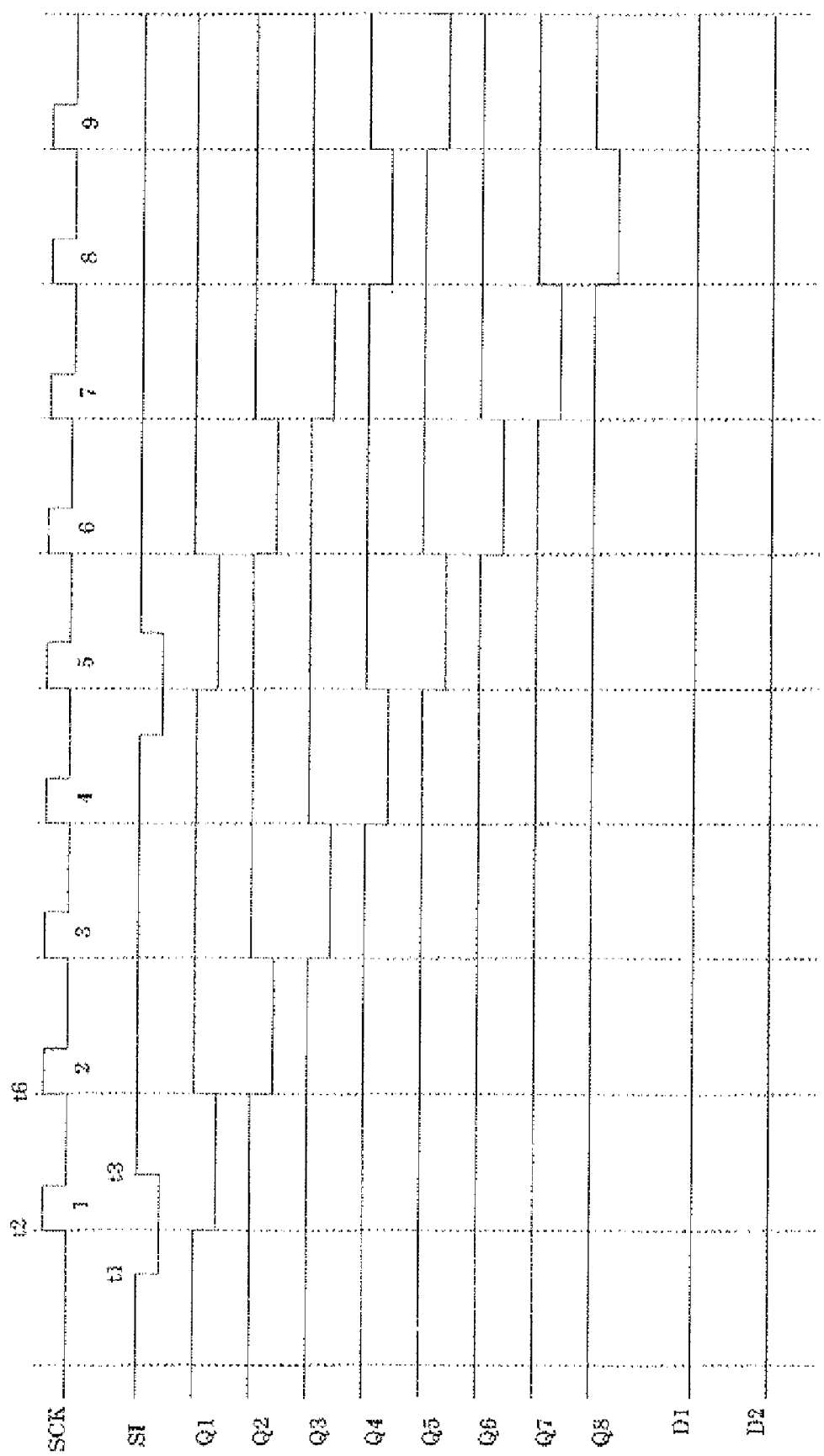
FIG. 10 is a time diagram illustrating an operation of the modification of the first disclosed embodiment.
Figure 11:
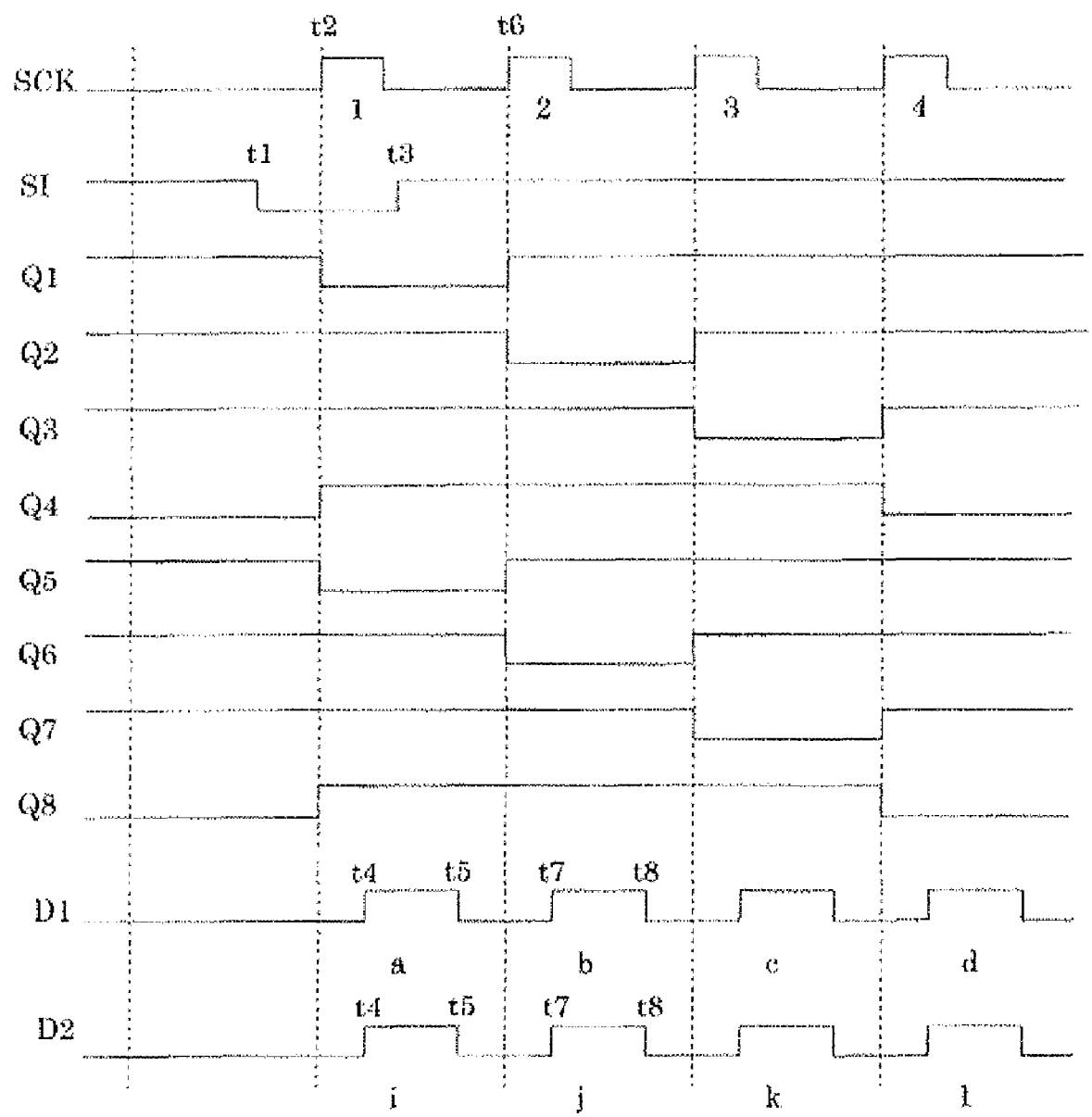
FIG. 11 is a time diagram illustrating an operation of the modification of the first disclosed embodiment.

FIG. 10 and FIG. 11 are timing diagrams that illustrate an operation of the circuit of the modification illustrated in FIG. 9. The present view illustrates a situation of one line scan at the time of the print operation in a printer, illustrates an operation in the case of making each group of the light-emitting thyristor d1-d4 and d5-d8 of FIG. 9 turn on one-by-one, respectively, and also illustrates a preset processing of a shift register performed as a preliminary operation at the time of a printer power source injection.

In FIG. 10, after setting an SI terminal to a Low level at the time t1, a clock pulse (the first pulse) is given to the clock terminal SCK at the time t2. Next, the SI terminal is returned to a High level at the time t3. As the time t6 illustrates, the clock pulse SCK is inputted so that it may become the equivalent number to the number of steps of the shift register in all (the second pulse-the fourth pulse part). By doing this, the output of Q1-Q4 of the shift register respectively becomes High, High, High, and Low level.

After this, as mentioned above, a clock pulse (the fifth pulse) is given to the clock terminal SCK after setting the SI terminal to the Low level again. Next, after returning SI terminal to the High level, the clock pulse SCK is inputted so that it may become the equivalent number to the number of steps of the shift register in all (the sixth pulse-the eighth pulse part). By doing this, the output of Q1-Q4 of the shift register respectively becomes High, High, High, and Low level, and the output of Q5-Q8 of the shift register respectively becomes High, High, High, and Low level.

FIG. 11 is a timing diagram that illustrates the situation of the scanning drive of the light-emitting element performed after the processing of FIG. 10. The preset processing mentioned above is performed by the timing of the operation of FIG. 11, the output of Q1-Q4 of the shift register respectively becomes High, High, High, and Low level, and the output of Q5-Q8 of the shift register respectively becomes High, High, High, and Low level. In FIG. 11, the shift data input terminal SI is set to the Low level at the time t1 before scanning for one line. Next, the first pulse of the clock signal SCK is inputted at the time t2. When a SCK signal rises, the SI signal mentioned above is taken into a flip-flop circuit 31 of the first step of the shift register, and Q1, that is an output of the flip-flop circuit of a first step, transits to the Low level slightly after this. In the same manner as this, Q5, that is an output of the flip-flop circuit that corresponds to the fifth step, also transits to the Low level.

As a result, the output of Q1-Q4 of the shift register respectively becomes Low, High, High, and High level, and the output of Q5-Q8 of the shift register respectively becomes Low, High, High, and High level. In addition, after the clock SCK rises, the shift data input is again returned to the High level at the time t3.

Now, when Q1 and Q5 outputs move to the Low level, the gate electric potentials of the light-emitting thyristors d1 and d5 illustrated in FIG. 9 are reduced. Next, the signal of the data terminal D1 is set to High at the time t4 ("a" part), and also the signal of the data terminal D2 is set to the High level approximately at the same time ("i" part). This causes an electric potential difference of a forward direction between the anode and the gate of the light-emitting thyristors d1 and d5, and the light-emitting thyristors d1 and d5 turn on and in a light-emitting state according to a trigger current caused by this. Since the light-emitting state of the light-emitting thyristors d1 and d5 is mainly based on the electric current that flows between the anode and the cathode, the voltage applied between the anode and the cathode is set to zero in order to turn off the light-emitting thyristors d1 and d5 that were turned on by a light-emitting drive. For this reason, the electric potentials of the data terminals D1 and D2 are set to Low at the time t5.

Also as mentioned above, the light-emitting power of the light-emitting thyristors d1-d8 is mainly based on a current value that flows between the anode and the cathode. Therefore, by using the drive circuit equipped with a constant current characteristic like the anode driving output circuit (71, 72) used in FIG. 9, it can maintain the driving current at a predetermined value even if it causes some element variations on the voltage between the anode and the cathode at the time of light-emitting a light-emitting thyristor. In this way, the light-emitting power can be maintained at a predetermined value even if a supply voltage etc. has some change.

In addition, as shown in FIG. 11, although the data terminals D1 and D2 are set to the High level at the time t4 in order to make the light-emitting thyristors d1 and d5 emit light, and are set to the Low level at the time t5 in order to make the lights turn off, when there is no need to make the light-emitting thyristor d1 emit light, the data terminal D1 can be left in the Low level during the time between t4 and t5. Similarly, when there is no need to make the light-emitting thyristor d5 emit light, the data terminal D2 can be left in the Low level during the time between the time t4 and time t5. In this way, a light-emitting/non-light-emitting state of the light-emitting thyristors d1 and d5 can be switched with the value of the data terminals D1 and D2.

Likewise, by the second pulse of the SCK signal of FIG. 11, the outputs of Q1-Q4 of the shift register are respectively set to High, Low, High, and High level, and the outputs of Q5-Q8 of the shift register are respectively set to High, Low, High, and High level. Next, as shown at the time t7, the electric potential difference of a forward direction is caused between the anode and the gate of the light-emitting thyristors d2 and d6 by setting the data terminals D1 and D2 to High level as shown in the "b" part and the "j" part, and the light-emitting thyristors d2 and d6 turn on and become in a light-emitting state according to the trigger current caused by this.

Similarly, a series of light-emitting drives of the light-emitting thyristors d1-d4 and d5-d8 are performed by completing an operation to the fourth pulse of the SCK signal, and completing the drive controlling of the light-emitting thyristor by the data signals D1 and D. At this time, the outputs of Q1-Q4 of the shift register respectively become High, High, High, and Low level, the outputs of Q5-Q8 of the shift register respectively become High, High, High, and Low level, and it is in a similar state as the time of completing the preset processing described at FIG. 10. For this reason, the light-emitting drive of the light-emitting thyristor sequences d1-d4 and d5-d8 can be respectively operated one-by-one in parallel by repeating the similar processing as FIG. 11 during the continuing scanning drive of one line.

Second Embodiment

Figure 12:
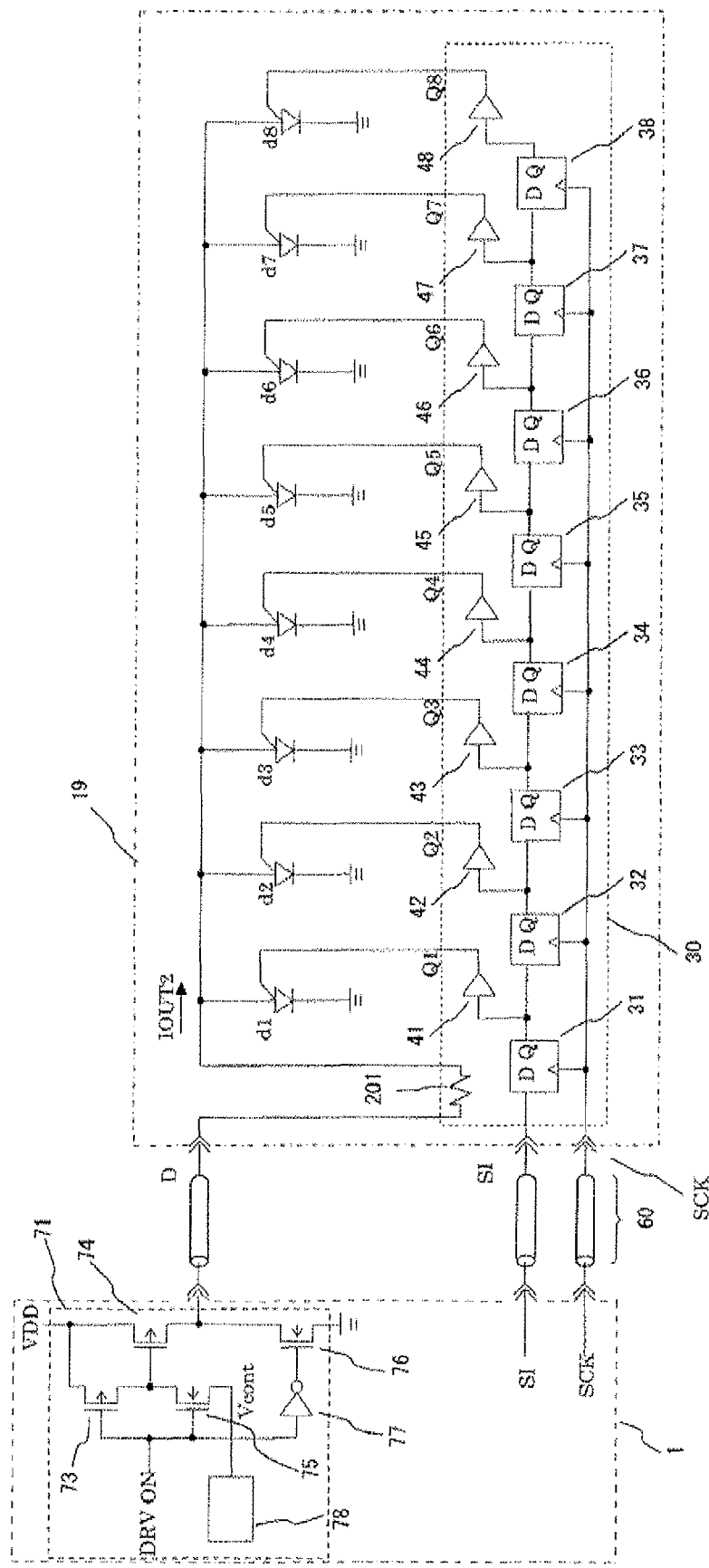
FIG. 12 is a circuit diagram illustrating an optical print head and a controller according to a second disclosed embodiment.

A second disclosed embodiment is now described. FIG. 12 illustrates an optical print head 19 and a print engine controller 1 in the second disclosed embodiment, their configuration and circumference, and how the light-emitting thyristor is used as a light-emitting element. In addition, although it is described that the light-emitting elements are only eight pieces in order to simplify the description in FIG. 12, a larger number can be used. For example, a head that can print in a resolution of 600 dots per inch on A4 size paper includes 4,992 light-emitting elements are 4,992, and 4,992 aligned steps of each circuit element in a configuration of FIG. 12.

As shown in FIG. 12, the disclosed circuit includes an optical print head 19, a print engine controller 1, and connecting cables 60 that connects the print engine controller 1 and the optical print head 19. As with the first disclosed embodiment, the circuit symbol illustrated as "->>-" in the view shows a connector. A resistor 201 is connected between a D terminal input of the optical print head 19 and the anode terminal of a light-emitting thyristor d1 etc., and this resistor 201 is arranged in the shift register part mentioned later. In addition, as mentioned later, when a characteristic impedance of the connecting cable 60 is set as Zo, and the resistance value of the resistor 201 is set as RL, the resistance value is set up in accordance with equation (1) above. Or when some ripple waveforms are acceptable in a transition state of a driving current waveform of the light-emitting thyristor, it may also be set in accordance with equation (2) above.

In the optical print head 19, a shift register 30 is shown surrounded with the broken line, elements 31-38 are flip-flop circuits and elements 41-48 are the buffer circuits that configure it. Although the shift register 30 is created using a CMOS structure on a silicon wafer base material, it can also be manufactured using a TFT technology on a glass substrate. The data signal transmitted via the connecting cable 60 is inputted into the optical print head 19, and passes through the resistor 201 arranged in an IC chip with the shift register 30. The disclosed shift register 30 mentioned above is a monolithically-integrated circuit with CMOS structure, for example. As mentioned above, one end of the resistor 201 is connected with the D terminal of the optical print head 19, and the other end of the resistor 201 is connected with the anode terminal of a light-emitting thyristor chip d1 etc. stuck on the IC chip with the shift register 30 mentioned above using a metal wiring formed by using a conventional photolithographic method. Elements d1-d8 are each light-emitting thyristors that include three terminals of an anode, a cathode, and a gate.

The optical print head 19 includes three input signal terminals, D, SI, and SCK. SI is a serial data input terminal to the shift register 30; SCK is a clock terminal of the shift register; and D is a data terminal that is connected with the anode terminal of the light-emitting thyristor mentioned above and supplies an anode current when the light-emitting thyristor is driven. The serial data terminal SI is connected with a D input terminal of the flip-flop 31, and a Q output terminal of the flip-flop 31 is also connected with an input of the buffer circuit 41 while being connected with a D input of the flip-flop 32 of a next step.

An output of the buffer circuit 41 is a Q1 output of the shift register 30, and is connected with the gate terminal of the light-emitting thyristor d1. The shift registers Q2-Q8 are formed in the same manner. The clock terminal SCK of the shift register 30 is connected with the clock terminal of the flip-flops 31-38, and a data terminal D of the optical print head 19 is connected with the anode of the light-emitting thyristors d1-d8. Also, the cathode terminal of the light-emitting thyristors d1-d8 is connected to a ground.

In the print engine controller 1, a driving output circuit 71 is shown surrounded with the broken lines. It includes PMOS transistors 73 and 74, NMOS transistors 75 and 76, an inverter circuit 77, and a CVGC 78 that generates a control voltage Vcont. A source of the PMOS transistor 73 is connected to the power source VDD, and its drain is connected to both the gate terminal of the PMOS transistor 74 and the drain terminal of NMOS transistor 75. The source of the NMOS transistor 75 is connected with the electric potential Vcont mentioned above.

A DRV-ON signal is a signal that instructs actual light-emitting/non-light-emitting timing of a light-emitting thyristor, and is connected with both an input terminal of an inverter circuit 77 and the gate terminals of the PMOS transistor 73 and the NMOS transistor 75. The source of the PMOS transistor 74 is connected with the power source VDD, and the drain terminal is connected with both the drain terminal of the NMOS transistor 76 and the D terminal of the optical print head 19. The source terminal of the NMOS transistor 76 is connected with the ground, and the gate terminal is connected with the output of the inverter circuit 77 mentioned above.

The case that the DRV-ON signal is set at a Low level is considered here. The output of the inverter circuit 77 becomes a High level, and the NMOS transistor 76 turns on. The NMOS transistor 75 is in an off-state, the PMOS transistor 73 is in an on-state, a voltage between a gate and a source of the PMOS transistor 74 becomes approximately zero volts, and the transistor 74 turns off. As a result, the data terminal D of the optical print head 19 becomes an output of approximately zero volts, an electric current IOUT2 that flows into each anode terminal of the light-emitting thyristors d1-d8 becomes zero, and all of the light-emitting thyristors d1-d8 can be made into a non-light-emitting state.

The case that the DRV-ON signal becomes a High level is now considered. At this time, an output of the inverter circuit 77 becomes a Low level, and the NMOS transistor 76 turns off. The NMOS transistor 75 is in an on-state, the PMOS transistor 73 is in an off-state, the gate electric potential of the PMOS transistor 74 becomes an approximately equal value to the Vcont electric potential that is an output of the CVGC 78, and the drain current flows into the transistor 74. As a result, the electric current IOUT2 can flow from the data terminal D of the optical print head 19 into the anode terminal of the light-emitting thyristors d1-d8, and only the element that an emission command is carried out from among the light-emitting thyristors d1-d8 selectively enters a light-emitting state.

The electric potential Vcont that is an output of the CVGC 78 is set up so that the PMOS transistor 74 may operate in a saturation region, as well known by the theory of electronic-device physics, the drain current Id at this time is given by equation (3) above, with the same variables as above, except applied to the circuit of FIG. 12.

In this way, the drain current Id of the PMOS transistor 74, i.e., the driving current IOUT2 of the light-emitting thyristors d1-d8, can be set to a preferable value by adjusting the Vcont electric potential mentioned above. In addition, like the PMOS transistor 74 mentioned above, in a MOS transistor that operates in a saturation region, even if a drain potential somewhat changes, it is possible to maintain a drain current value at a predetermined value by setting up the element size appropriately. Such characteristic is known as a constant current characteristic of the MOS transistor, and the Vgs voltage mentioned above is set up small while setting up large the gate length mentioned above, in order to obtain a good characteristic.

Figure 13A:
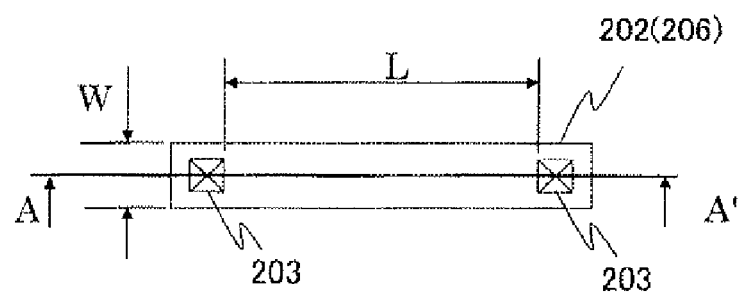
FIGS. 13A and 13B are views illustrating a configuration of a resistor according to a second disclosed embodiment.
Figure 13B:
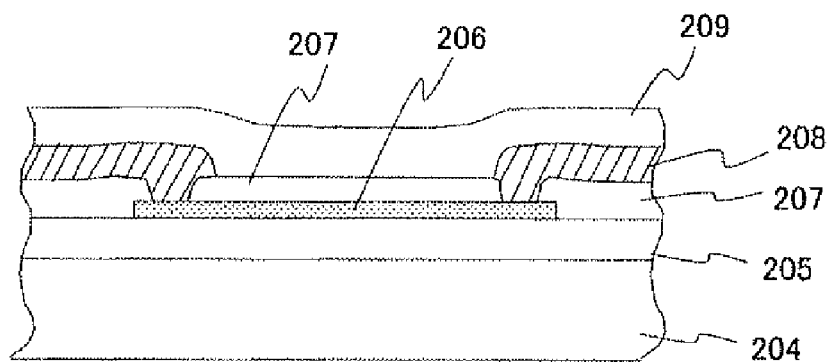

FIGS. 13A and 13B illustrate an exemplary configuration of the resistor 201 used in FIG. 12. FIG. 13A is a top view of a resistor arranged at a predetermined place in the shift register 30 mentioned above. In the embodiment of FIG. 13A, polysilicon is used as a resistor material. Element 202 shows a polysilicon part that configures the resistor, and element 203 shows a contact opening that is arranged on an upper surface of the polysilicon range mentioned above and is opened on a passivation film (not shown).

FIG. 13B is a sectional view of FIG. 13A along the line A-A'. In FIG. 13B, element 204 is a wafer base material made of silicon, and is formed as an IC chip common with the shift register 30 mentioned above. Element 205 is an insulating layer (i.e., a field oxide) using a $SiO_2$ raw material; element 206 is a polysilicon film formed on the insulating layer 205; element 207 is an interlayer insulation film; element 208 is a metal wiring; and element 209 is a passivation overcoat covering the upper surface of the IC.

When a width of the polysilicon region mentioned above is set to W, and a distance between the contact openings mentioned above is set to L, a sheet resistance value of the polysilicon mentioned above is set to Rs [$\Omega/\square$] and the resistance value between the contact openings of FIG. 13A is set to RL, RL is given with a next equation.

$$RL = \frac{L}{W} \times Rs \quad (13)$$

As is obvious with reference to the upper equation, since the resistor 201 shown in FIG. 12 is created like the configuration of FIGS. 13A and 13B, it can be set to a preferable value by setting up appropriately the polysilicon width W and the contact opening gap L mentioned above.

Figure 14A:
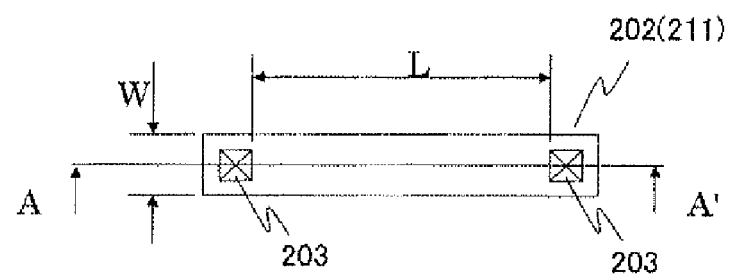
FIGS. 14A and 14B are views illustrating a configuration of a resistor according to a second disclosed embodiment.
Figure 14B:
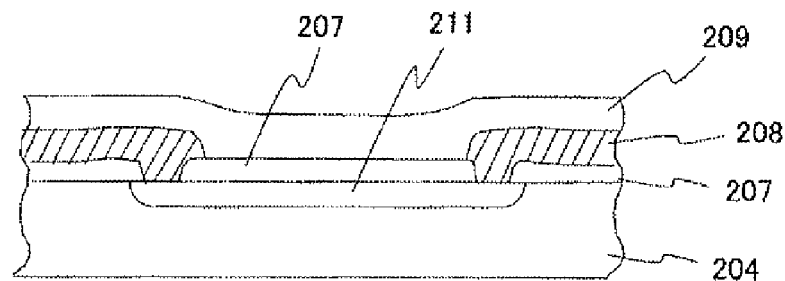

FIGS. 14A and 14B show an alternate example of a configuration for forming a resistor using a diffusion region of an impurity instead of polysilicon of FIGS. 13A and 13B. FIG. 14A is a top view of a resistor 201, and FIG. 14B is a sectional view along the line A-A' in FIG. 14A. In this view, element 204 is a wafer base material made of silicon and is formed as an IC chip common with the shift register 30 mentioned above. When something containing an N-type impurity is used as a wafer base material 204 mentioned above, a resistor 211 is formed by diffusing a P-type impurity at the predetermined place. Alternatively, when something containing a P-type impurity as the wafer base material 204 mentioned above, the resistor 211 is formed by diffusing an N-type impurity at the predetermined place. As an alternative, it can be formed as an N diffused resistor by forming a P-type well part in the predetermined place of an N-type wafer base material, and making the predetermined part in the well diffuse an N-type impurity, or it can be formed as a P diffused resistor by forming an N-type well part in the predetermined place of a P-type wafer base material, and making the predetermined part in the well diffuse a P-type impurity. Element 207 is the interlayer insulation film; element 208 is the metal wiring; and element 209 is the passivation overcoat covering the upper surface of the IC.

When a width of the diffused resistor region mentioned above is set to W, and a distance between the contact openings mentioned above is set to L, the sheet resistance value of the diffused resistor mentioned above is set to Rs [$\Omega/\square$] and the resistance value between the contact openings of FIG. 14A is set to RL, RL is set according to equation (13). As is obvious with reference to the upper equation, since the resistor 201 shown in FIG. 12 is created like the configuration of FIGS. 14A and 14B, it can be set to a preferable value by setting up appropriately the diffused resistor width W and the contact opening gap L mentioned above.

FIG. 15 is a view that is equivalent-circuit-modeled by choosing a light-emitting thyristor d1 represented from the circuit illustrated in FIG. 12. FIG. 15 replaces the driving output circuit 71 to a constant current source symbol from among the circuits illustrated in FIG. 12, and sets the current value as Is. Element 60 is a connecting cable that connects between the print engine controller 1 and the optical print heads 19, and is illustrated as a transmission path that has the characteristic impedance as Zo and a signal transfer delay time as Td. The resistance value of the resistor 201 is marked as RL. Element 82 is an equivalent-circuit modeled by choosing a light-emitting thyristor d1 represented from the light-emitting elements of an optical print head.

In order to set the light-emitting thyristor d1 into on-state, a resistor Rg is connected between a gate and a cathode. In this way, a part of current components from among the anode current Id that flows an anode terminal, flows into the ground via the resistor Rg as a gate current, and the light-emitting thyristor d1 is made on-state by the gate current. Element Cj is a capacitor that models the junction capacitance caused between an anode and a cathode of the light-emitting thyristor d1, d2, etc.

FIG. 16A illustrates a waveform of the driving source electric current Is that is a signal source, and the on-time and off-time is respectively shown in a view as Ton and Toff. FIG. 16B illustrates the driving current waveform of the light-emitting thyristor at the time of making the resistance value RL go to zero similar to the configuration by a conventional technology for a comparison.

As for the connecting cable mentioned above, when a cable length is set to L and a signal propagation velocity in the cable is set to Vo, the signal transfer delay time Td of the cable is given according to equation (5), with the same variables used, except applied to the circuit of FIG. 15.

As noted above in equation (9), in a typical example, when the relative permittivity of a cable is set to 4 and the cable length is set to one meter, the signal transfer delay becomes approximately 6.7 nS.

As shown in FIG. 15, a modeled optical print head 82 is shown surrounded with a broken line. Element d1 illustrates one element of the light-emitting thyristor, and the resistor Rg connected between the gate terminal and the cathode terminal is inserted in order to make on-state the light-emitting thyristor mentioned above. Cj is a capacitor that models the electrostatic capacitance caused between the anode and the cathode of the light-emitting thyristor sequence mentioned above.

In conventional technology, as illustrated in FIG. 16B, when the driving source waveform Is rises, a driving signal reaches to the light-emitting thyristor d1 after Td minutes mentioned above, and the current waveform Id begins to rise in the light-emitting thyristor d1 that is a driven element. At this time, a part between the anode and the cathode of the light-emitting thyristor d1 equivalently operates similar to the capacitor Cj. This causes a signal reflection by the element, and causes the reflected wave that goes through and inside the connecting cable 60 in the direction of a driving signal source. The reflected wave mentioned above is reflected according to the internal impedance of the driving signal source, and causes a reflection inside of the connecting cable 60 in the direction of the optical print head 19 again. In this way, the current waveform is obtained that rises in the rise time Tr, causing a signal reflection in multiplex between the driving signal source and a load (i.e., thyristor), and causing the ripple in a cycle of 2×Td via the connecting cable 60.

As is obvious by comparing the waveform of FIG. 16A with the waveform of FIG. 16B, even if a rising of the driving signal source waveform is steep, the rise time Tr of the driving current waveform of the light-emitting thyristor becomes large. When a multiple reflection waveform reduces the reflected amount by going and coming back through the cable 60, and a reflected component disappears after 10 round trips, the rise time Tr can be calculated according to equation (10) above. As noted above, this is similar to the fall time Tf for the falling of the driving current of the light-emitting thyristor.

Although the rise time Tr mentioned above is a large value compared with the rise time of the driving signal source, it is mainly determined by the propagation delay time of the connecting cable 60, i.e., by the cable length. As a result, the cable length has to be shortened in order to raise the lighting switching speed of the print head. However, since the cable length is restrained by the situation of the parts arrangement in the printer, it may be difficult to shorten it. This is particularly true in a tandem color printer configured by sequentially arranging each color toner unit, such as black, yellow, magenta, and cyan. The cable lengths differ for each color, and they can be one meter long or more. As a result, the problem occurs that the rise time and the fall time of the driving current of the light-emitting thyristor increase, and that the switching speed of the print head using it cannot be increased.

In contrast, the second disclosed embodiment is configured such that the resistor 201 is inserted in series in the data terminal of the optical print head 19. In the second disclosed embodiment, the characteristic impedance of the connecting cable 60 is set to Zo and the resistance value of the resistor 201 mentioned above is set to RL. FIG. 16C illustrates the driving current waveform at the time of setting up the resistance value so that it becomes RL=Zo. This solves the phenomena of a ripple waveform at the time of signal transition that is seen in FIG. 16B and an increase in transition time. In such a situation it turns out that it is switchable in a comparatively short rise time Tr and fall time Tf.

Although in the second disclosed embodiment mentioned above, RL is set up to become equal to Zo when the resistance value of the resistor 201 is set to RL, in some cases some ripple waveforms are acceptable in the transition state of the driving current waveform of a light-emitting thyristor. In such situations, a similar effect also can be acquired by setting RL to be between twice Zo and half of Zo, as shown by equation (11).

As described above with respect to the second disclosed embodiment, in the optical print head 19 comprising the light-emitting thyristors d1-d8 and the shift register 30 and its driving output circuit 71, the driving output circuit 71 and the optical print head 19 are configured as different substrate units, both of which are electrically connected using the connecting cable 60. In such a circuit a switching control of the light-emitting thyristor can be performed at high speed, even when the connecting cable 60 is long. This is accomplished by solving the problem that the rise time and the fall time of the driving current waveform become increase because of the signal reflection occurring in multiplex between the driving output circuit 71 and the light-emitting thyristor.

In addition, in the configuration of the second disclosed embodiment, while a light-emitting thyristor is stuck on the IC chip with the shift register 30 mentioned above, since it is monolithically-integrated by also forming a resistor 201 for the termination of the data signal of the light-emitting thyristor mentioned above on the shift register IC, and there is no need to set it individually, which provides for advantageously low cost. In addition, although the resistor 201 (for the termination of the data signal) in the second disclosed embodiment has the configuration set on the shift register IC as polysilicon or an impurity diffusion resistor, alternate embodiments can use different configurations. For example, it can be configured by sticking the compound semiconductor thin film of AlGaAs etc. on an IC chip with a shift register using a conventional epitaxial film bonding method, also by forming a pattern on the predetermined region of the film mentioned above with the photolithographic method.

Third Embodiment

Figure 17:
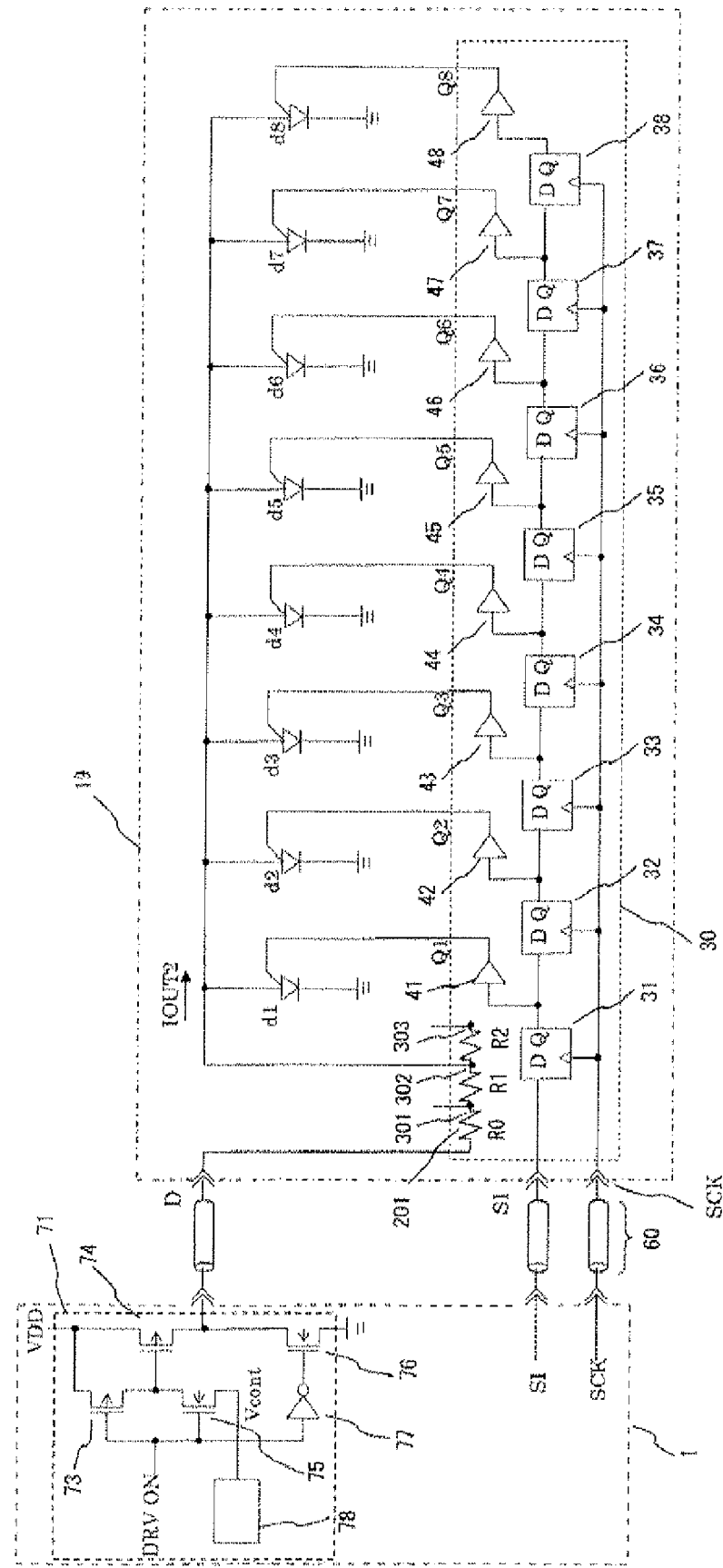
FIG. 17 is a circuit diagram illustrating an optical print head and a controller according to a third disclosed embodiment.

Next, a third disclosed embodiment is described. FIG. 17 illustrates an optical print head 19 and the print engine controller 1, and the configuration of the circumference of it in the third disclosed embodiment, in which light-emitting thyristors are used as light-emitting elements. In addition, although this embodiment describes that the light-emitting elements are only eight pieces in order to simplify the description in FIG. 17, this is by way of example only. A head that can print in a resolution of 600 dots per inch on A4 size paper employs 4,992 total light-emitting elements, and a total of 4,992 aligned steps of each circuit element in a configuration of FIG. 17.

In FIG. 17, element 19 shows an optical print head, element 1 shows a print engine controller, element 60 shows a connecting cable that connects the print engine controller 1 and the optical print head 19. Also, the circuit symbol illustrated as "->>-" in the view shows a connector. A resistor 201 is connected between a D terminal input of the optical print head 19 and the anode terminal of a light-emitting thyristor d1 etc., and the resistor 201 is arranged in the shift register part mentioned below. Middle point taps 301, 302, and 303 are formed in the resistor 201, and each section resistor is shown in the view as R0, R1, and R2 in FIG. 17.

One end of the resistor 201 (i.e., an end of the resistor R0) is connected with the data terminal D of the optical print head 19; the other end of the resistor R0 is connected to both one end of the resistor R1 and the middle point tap terminal 301; the other end of the resistor R1 is connected to both one end of the resistor R2 and the middle point tap terminal 302; and the other end of the resistor R2 is connected to the middle point tap terminal 303. In addition, the middle point tap terminals 301, 302, and 303 mentioned above correspond to the contact opening 203 in the second disclosed embodiment illustrated in FIG. 13A, for example, and correspond to the contact opening 203 that is opened to the passivation film on the polysilicon region 202 that forms a resistor part.

In addition, as mentioned below, when a characteristic impedance of the connecting cable 60 is set as Zo, and the resistance value of the resistor 201 (what a totaled resistance value of the resistor R0 and the resistor R1 in FIG. 17) is set as RL, the resistance value is set up in accordance with equation (1) above to become equal to Zo. In the alternative, when some ripple waveforms are acceptable in a transition state of a driving current waveform of the light-emitting thyristor, it may also be set to be between half of Zo and twice Zo, as set forth in equation (2).

The connecting cable 60 in FIG. 17 may be a coaxial cable, a twisted pair electric wire, or even a flexible flat cable and a flexible printed circuit board. However, in a connecting means that is mentioned above, the characteristic impedance becomes a variously different thing, and cannot be defined uniquely. Therefore, it is necessary to adjust a termination resistance value so that it can agree with the characteristic impedance Zo mentioned above. Once the middle point taps 301, 302, and 303 are formed into the resistor 201 mentioned above, it becomes possible to make the optical print head 19 according to various cable construction by connecting to the tap location near the preferable resistance value.

In the optical print head 19, a shift register 30 is shown surrounded with a broken line. It includes a plurality of flip-flop circuits 31-38 and a plurality of buffer circuits 41-48. In various embodiments, the shift register 30 may be created using a conventional CMOS structure on a silicon wafer base material, or can be manufactured using a conventional TFT technology on a glass substrate. The data signal transmitted via the connecting cable 60 is inputted into the optical print head 19, and connected with one end of the resistor 201 arranged in an IC chip with the shift register 30. The shift register 30 may be a monolithically-integrated circuit having a CMOS structure, for example. The other end of the resistor 201 or the middle point tap 303, and an anode terminal of a light-emitting thyristor chip stuck on the IC chip with the shift register mentioned above are connected by a metal wiring. The metal wiring mentioned above can be easily created by using a conventional photolithographic method.

The light-emitting thyristors d1-d8 each includes three terminals of an anode, a cathode, and a gate. The optical print head 19 includes three input signal terminals of D, SI, and SCK. SI is a serial data input terminal to the shift register 30; SCK is a clock terminal of the shift register; and D is a data terminal that is connected with the anode terminal of the light-emitting thyristor mentioned above and supplies an anode current when the light-emitting thyristor is driven. A serial data terminal SI is connected with a D input terminal of the flip-flop 31, and a Q output terminal is also connected with the input of the buffer circuit 41 while being connected with a D input of the flip-flop 32 of a next step. The output of the buffer circuit 41 is a Q1 output of the shift register 30, and is connected with the gate terminal of the light-emitting thyristor d1. Outputs Q2-Q8 of the shift register are generated in a similar manner. The clock terminal SCK of the shift register is connected with the clock terminal of the flip-flops 31-38, and the data terminal D of the optical print head 19 is connected with the anodes of the light-emitting thyristors d1-d8. Also, the cathode terminals of the light-emitting thyristors d1-d8 are connected to ground.

In the print engine controller 1, the driving output circuit 71 is surrounded with the broken line. It includes PMOS transistors 73 and 74, NMOS transistors 75 and 76, an inverter circuit 77, and a CVGC 78 that generates a control voltage Vcont. The source of the PMOS transistor 73 is connected to the power source VDD, and its drain is connected with both the gate terminal of the PMOS transistor 74 and the drain terminal of the NMOS transistor 75. The source of the NMOS transistor 75 is connected with the Vcont electric potential. Also, a DRV-ON signal is a signal that instructs an actual light-emitting/non-light-emitting timing of the light-emitting thyristor. It is connected with the gate terminals of the PMOS transistor 73 and the NMOS transistor 75, as well as an input of the inverter circuit 77. The source of the PMOS transistor 74 is connected with the power source VDD, and its drain terminal is connected with both the drain terminal of the NMOS transistor 76 and the D terminal of the optical print head 19. The source terminal of the NMOS transistor 76 is connected to the ground, and its gate terminal is connected with the output of the inverter circuit 77.

Here, the case that a DRV-ON signal is a Low level is considered. The output of the inverter circuit 77 becomes a High level, and the NMOS transistor 76 turns on. The NMOS transistor 75 is in an off-state, the PMOS transistor 73 is on-state, the voltage between a gate and a source of the PMOS transistor 74 becomes approximately zero volts, and the transistor 74 becomes off. As a result, the data terminal D of the optical print head 19 becomes an output of approximately zero volts, the electric current IOUT2 that flows into each anode terminal of the light-emitting thyristors d1-d8 also becomes zero, and all of the light-emitting thyristors d1-d8 can be set to non-light-emitting state.

As the other case, the case that the DRV-ON signal is set to a High level is considered. At this time, the output of the inverter circuit 77 becomes a Low level, and the NMOS transistor 76 becomes off. The NMOS transistor 75 is in an on-state, the PMOS transistor 73 is in an off-state, the gate electric potential of the PMOS transistor 74 becomes an approximately equal value to the electric potential Vcont that is an output of the CVGC 78, and the drain current flows into the transistor 74. As a result, the electric current IOUT2 may flow from the data terminal D of the optical print head 19 into the anode terminal of the light-emitting thyristor, and only the one of the light-emitting thyristors d1-d8 that the emission command is carried out from selectively enters a light-emitting state.

The electric potential of Vcont that is an output of the CVGC 78 is set up so that the PMOS transistor 74 may operate in a saturation region, and the drain current Id at this time is determined according to equation (3) above, except that the variables are determined based on the circuit of FIG. 17.

In this way, the drain current Id of the PMOS transistor 74, i.e., the driving current IOUT2 of the light-emitting thyristor, can be set to a desirable value by adjusting the electric potential Vcont output from the CVGC 78. In addition, in the MOS transistor that operates in a saturation region like the PMOS transistor 74 mentioned above, even if the drain potential somewhat changes somewhat, it is possible to maintain a drain current value at a predetermined value by setting up the element size appropriately. Such characteristic is generally known as a constant current characteristic of the MOS transistor, and the Vgs voltage mentioned above is set up small while setting up the gate length mentioned above to be larger in order to obtain good characteristics.

Figure 18:
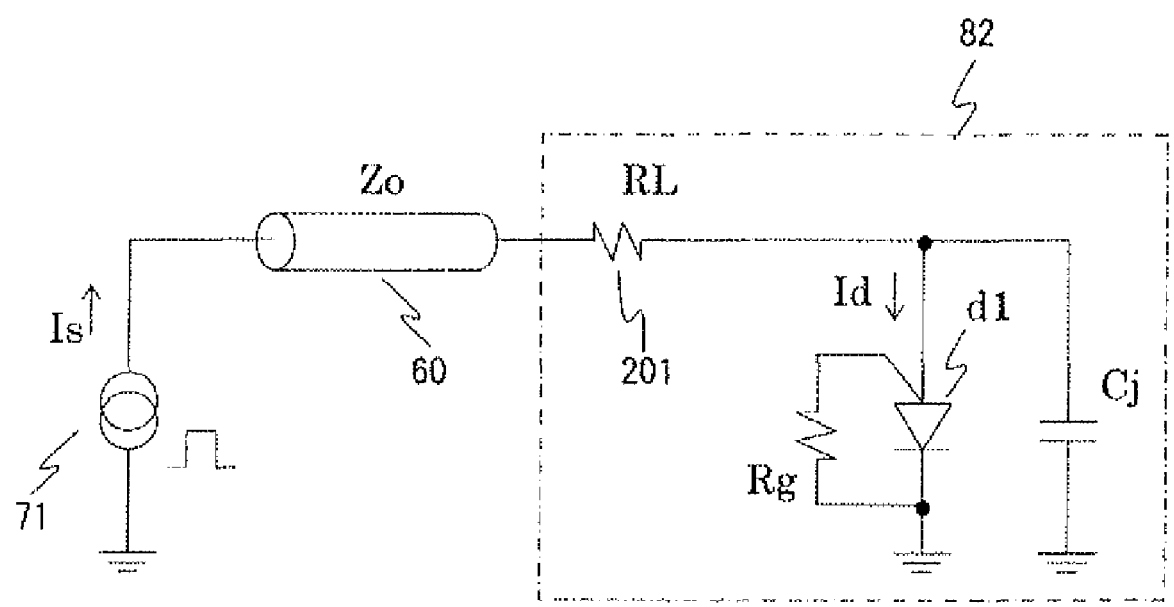
FIG. 18 is a circuit diagram illustrating an equivalent circuit model of the light-emitting thyristor according to a third disclosed embodiment.

Next, the operation of the third disclosed embodiment is described. FIG. 18 is a view that is an equivalent-circuit modeled by choosing a light-emitting thyristor d1 represented from the circuit illustrated in FIG. 17. The driving output circuit 71 is replaced to a constant current source symbol from among the circuits illustrated in FIG. 17, and sets the current value as Is. Element 60 is a connecting cable connects between the print engine controller 1 and the optical print head 19, and is illustrated as a transmission path that has characteristic impedance Zo and the signal transfer delay time Td. Also, the resistance value of the resistor 201 is marked as RL. Element 82 is a light-emitting thyristor d1 that is equivalent-circuit-modeled by choosing a representative from the light-emitting element of the optical head 19.

In order to make the light-emitting thyristor d1 into on-state, a resistor Rg is connected between a gate and a cathode. In this way, a portion of the anode current Id flows instead to the ground as a gate current via the resistor Rg, and the light-emitting thyristor d1 is made on-state by the gate current. Cj is a capacitor and is a model of the electrostatic capacitance caused between an anode and a cathode of the light-emitting thyristor d1, d2, etc.

Figure 19:
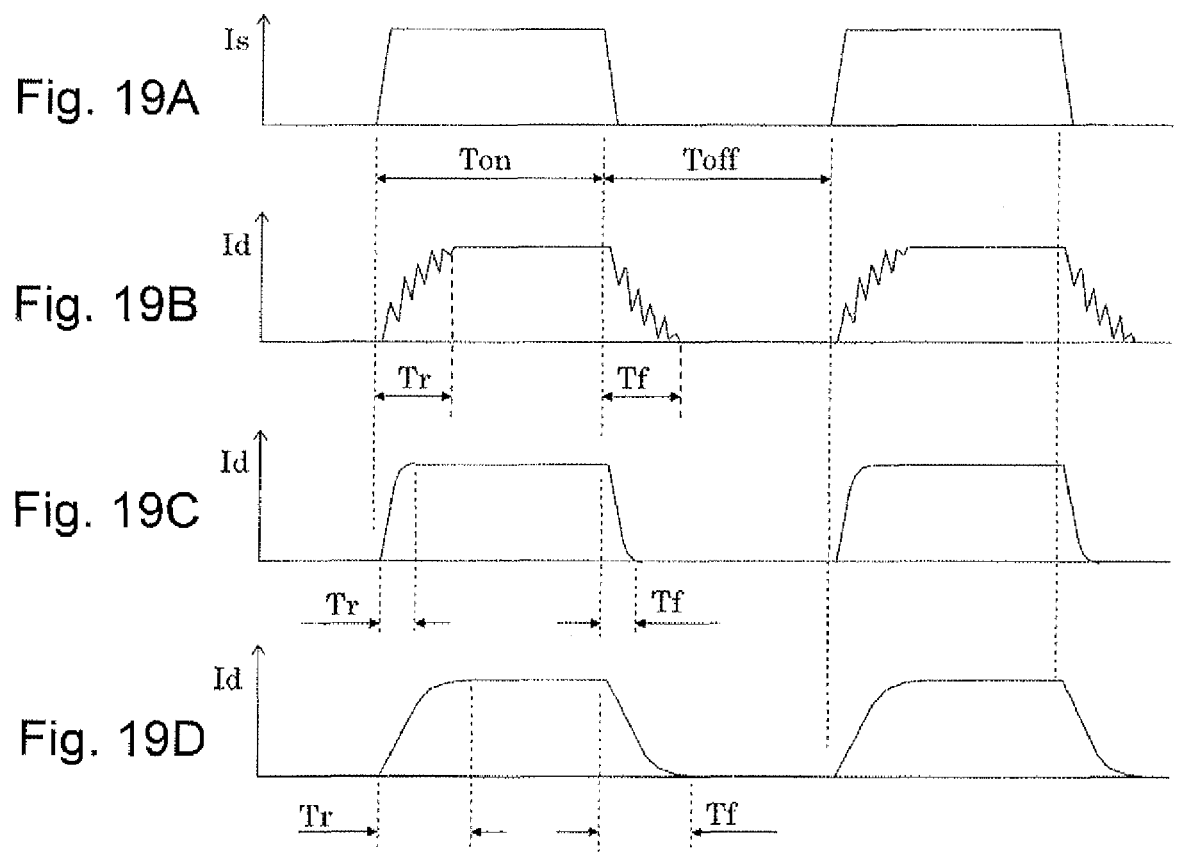
FIGS. 19A-19D are time diagrams illustrating a driving current waveform to a light-emitting thyristor according to a third disclosed embodiment.

FIG. 19A illustrates the waveform of the driving source electric current Is that is a signal source, and the on-time and off-time are respectively shown in a view as Ton and Toff. FIG. 19B illustrates a driving current waveform of the thyristor when the resistance value RL is set to zero as a configuration using a conventional device for a comparison.

As for the connecting cable mentioned above, when the cable length is set as L, a signal propagation velocity in the cable is set as Vo, the signal transfer delay time of a cable Td is determined according to equation (5), above, where the variables are determined as shown above, except using elements from the third disclosed embodiment. As noted above, in a typical example in which the relative permittivity of a cable is set to 4 and the cable length is set to one meter, the signal transfer delay time is about 6.7 nS.

Although FIG. 19B shows the case that the termination resistance value mentioned above is set to zero, when the driving source waveform Is rises, the driving signal reaches the light-emitting thyristor d1 delaying for Td minutes, and the current waveform Id begins to rise in the light-emitting thyristor as a driven element. At this time, a part between the anode and the cathode of the light-emitting thyristor d1 equivalently operates similar to the capacitor Cj. It causes a signal reflection by the element, and causes the reflected wave that goes through inside the connecting cable 60 in the direction of a driving signal source. The reflected wave is reflected according to the internal impedance of the driving signal source, and causes reflection again inside the connecting cable 60 in the direction of the optical print head 19. In this way, the current waveform that rises in the rise time Tr is obtained with causing a signal reflection in multiplex between the driving signal source and a load (i.e., thyristor) and causing the ripple in a cycle of 2×Td via the connecting cable 60.

As is obvious by comparing with the waveform of FIG. 19A and the waveform of FIG. 19B, even if a rising of a driving signal source waveform is steep, the rise time Tr of the driving current waveform of a light-emitting thyristor becomes large. When the multiple reflection waveform mentioned above reduces the reflected amount by going and coming back through the cable, and the reflected component disappears after 10 round trips, the rise time Tr of the signal mentioned above is determined based on equation (10) above, which sets it to about 134 nS in the third disclosed embodiment. Something similar occurs with the fall time Tf of the driving current of the light-emitting thyristor.

The rise time Tr of the driving current of the light-emitting thyristor is a big value compared with the rise time of the driving signal source, and the value is mainly determined by the propagation delay time of the connecting cable, i.e., by the cable length. As a result, the cable length has to be shortened so as to raise the lighting switching speed of the optical print head. However, since the cable length is restrained by the situation of the parts arrangement in a printer, it may be difficult to shorten it. This is especially true in a tandem color printer configured by sequentially arranging each color toner unit, such as black, yellow, magenta, and cyan. The cable lengths differ for each color, and it may be as long as one meter. As a result, there occurs the problem that the rise time and the fall time of driving current of the light-emitting thyristor increase, and the switching speed of the optical print head using it cannot be increased.

In contrast, in the third disclosed embodiment, a middle point tap is configured to be taken out by inserting a series connection circuit in which a plurality of resistors are connected in series into the data terminal of the optical print head. FIG. 19C is an example of setting a resistance value RL of the resistor 201 such that it becomes equal to the characteristic impedance of the connecting cable Zo, as shown above in equation (11). In this case, a ripple waveform at the time of signal transition that is seen in FIG. 19B, and the phenomenon that the transition time increases are solved, and it turns out that it can switch in comparatively short rise time Tr and fall time Tf.

Although in the example mentioned above, the resistance value of the resistor 81 mentioned above is set as RL, and it is set to become equal to Zo, in alternate embodiments some ripple waveforms are acceptable in the transition state of the driving current waveform of the thyristor. In such a case a similar effect also can be acquired my making RL be between half of Zo and twice Zo, as set forth in equation (12) above.

When the characteristic impedance of the connecting cable mentioned above is set as Zo and the resistance value of the resistor 201 mentioned above is set to RL, FIG. 19D shows an example at the time of setting up the resistance value so that it may become RL>>Zo. In this case, although the ripple waveform at the time of the signal transition seen in FIG. 19B is solved, since the rise time Tr and the fall time Tf increase, it is not desirable for accelerating the switching operation of a light-emitting thyristor.

As is obvious by comparing each waveform of FIG. 19B, FIG. 19C, and FIG. 19D, when a termination resistance value is too small in contrast with the characteristic impedance of the connecting cable (FIG. 19B), a ripple waveform is caused at the time of a signal transition, and a long settling time is required. When a termination resistance value is excessive in contrast with the characteristic impedance of the connecting cable (FIG. 19D), although the ripple waveform is not produced at the time of the signal transition, the transition time becomes long.

On the other hand, when a termination resistance value is adjusted and set up appropriately in contrast with the characteristic impedance of the connecting cable (FIG. 19C), a ripple waveform is not caused at the time of the signal transition. Moreover, the transition time can also be shortened at the same time. This is desirable for accelerating the switching operation of a light-emitting thyristor.

As described above, with respect to the third disclosed embodiment, in the light-emitting thyristors d1-d8 and the driving output circuit 71, the driving output circuit 71 and the light-emitting thyristor are configured as different substrate units, both of which are electrically connected using the connecting cable 60. Furthermore, a switching control of the light-emitting thyristor can be performed at high speed, even when the connecting cable 60 is long, by solving the problem that the rise time and the fall time of the driving current waveform become increase because of the signal reflection occurring in multiplex between the driving output circuit 71 and the light-emitting thyristor.

Also in the third disclosed embodiment, while a light-emitting thyristor is stuck on the IC chip with the shift register mentioned above, since it is monolithically-integrated by also forming a resistor 201 (for the termination of the data signal) on the shift resistor IC for the termination of the data signal of the light-emitting thyristor mentioned above, there is no need to set it individually. This allows for advantageously low cost. In addition, in the third disclosed embodiment, the middle point taps 301, 302, and 303 are previously formed in the resistor 201 mentioned above, and they can be adjusted to the termination resistance value according to the characteristic impedance of various connecting cables. In this way, a ripple waveform cannot be caused at the time of the signal transition of the data signal of an optical print head, the transition time can be minimized, the switching operation of a light-emitting thyristor can be accelerated, and the printing speed of the printer that carries them can be accelerated.

As mentioned above, connecting cable of an optical print head may be a coaxial cable, a twisted pair electric wire, a flexible flat cable, a flexible printed circuit board, etc. However, in a connecting means that was mentioned above, the characteristic impedance becomes a variable, and cannot be defined uniquely. Therefore, it is necessary to set a termination resistance value so that it can agree in the characteristic impedance Zo mentioned above. As for a configuration of the third disclosed embodiment, the middle point taps 301, 302, and 303 are previously formed to the resistor 201 mentioned above. This makes it becomes possible to make the optical print head 19 assigned according to various cable construction by connecting at the tap location near the preferable resistance value. It also allows for a solution to the problem that the transition time of the driving waveform increases, and the waveform that is greatly different between the characteristic impedance of the cable that is mentioned above and the termination resistance value.

In addition, although the resistor 201 in the third disclosed embodiment is configured to be set on the shift register IC as polysilicon or an impurity diffusion resistor, other than this, in alternate embodiments it can be configured by sticking the compound semiconductor thin film of AlGaAs etc. on the IC chip with the shift register using a conventional epitaxial film bonding method. It can also be made by forming a pattern on the predetermined region of the film mentioned above with the photolithographic method.

Figure 20:
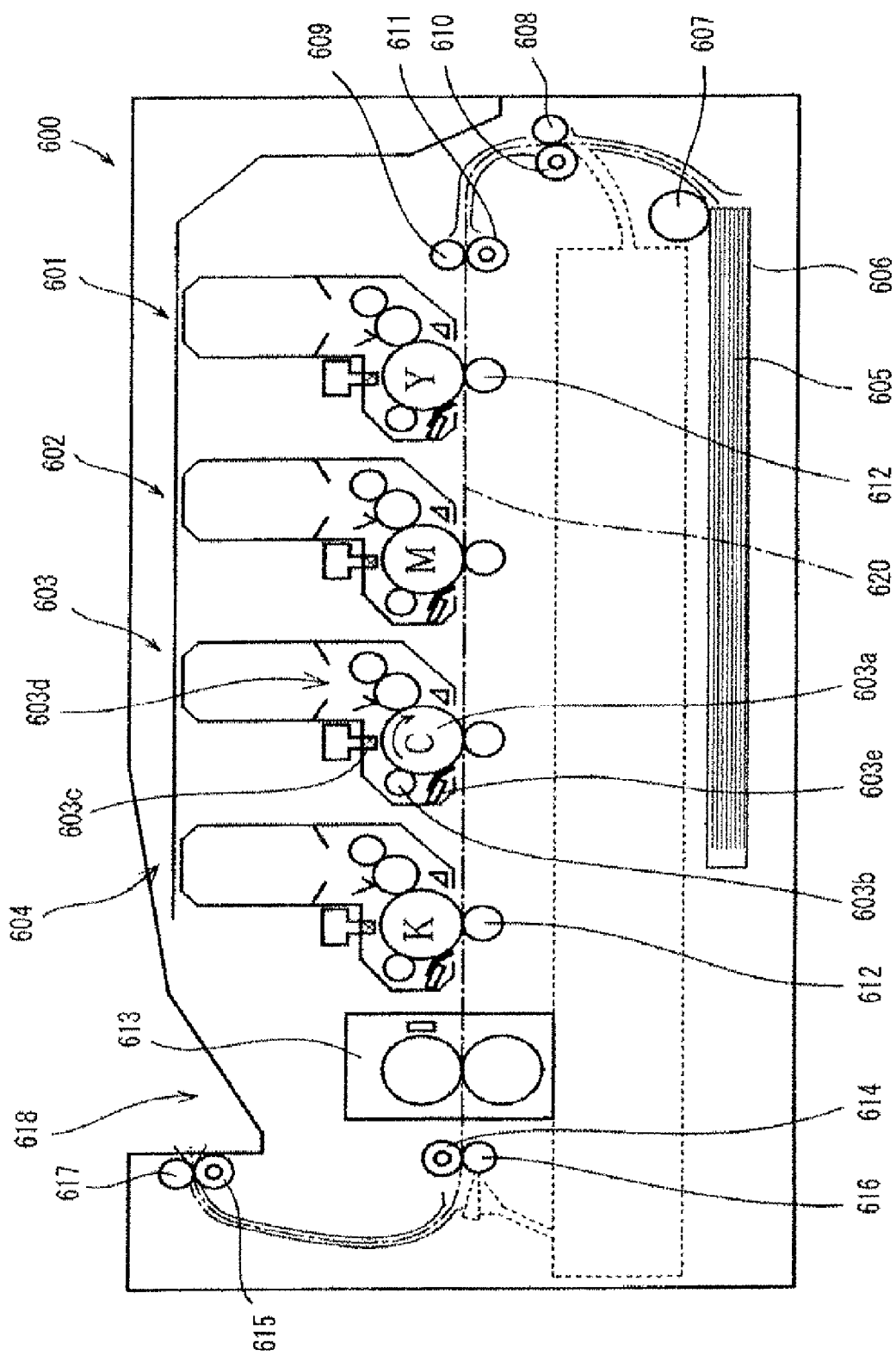
FIG. 20 is a schematic configuration view illustrating a tandem color printer according to disclosed embodiments.

The light-emitting element array described in the first through third discloses embodiments above can be used as a luminous source in the exposure process of an electrophotographic printer. A tandem color printer is taken up as an example below, and described using FIG. 20. FIG. 20 is a schematic configuration view illustrating the tandem color printer using a thyristor head in that the semiconductor complex device of the present invention is mounted.

As shown in FIG. 20, a tandem color printer 600 has four processing units 601-604 that form an image of each color of black (K), yellow (Y), magenta (M), and cyan (C) in each. These are arranged sequentially from the upstream of a feeding path of a recording medium 605. Since the internal configuration of these processing units 601-604 is in common, the internal configuration is described using the processing unit 603 of magenta for an example.

A photoconductor drum 603*a* is arranged rotatable in an arrow direction in the processing unit 603 as an image supporter, A charging device 603*b* that supplies a charge and charges to a surface of the photoconductor drum 603*a* around this photoconductor drum 603*a*, and an exposing device 603*c* that selectively irradiates the surface of the charged photoconductor drum 603*a*, and forms an electrostatic latent image on it, are arranged sequentially around the photoconductor drum 603*a* from upstream in the direction of rotation. The optical print head (19) described in each embodiment mentioned above is used as the exposing device 603*c*.

Furthermore, a developing device 603*d* that adheres toner of a predetermined color (e.g., magenta) to the surface of the photoconductor drum 603*a* that the electrostatic latent image is formed on and generates a visual image, and a cleaning device 603*e* that removes any toner that remains when the visual image of the toner on the photoconductor drum 603*a* is transferred, are also arranged around the photoconductor drum 603*a*. In addition, the drums or rollers used for these each device are rotated by a power transmitted via a gear etc. from a driving source (not shown).

Also the tandem color printer 600 is equipped with a paper cassette 606 and a hopping roller 607. The paper cassette 606 is at the lower part and stores a recording medium 605, such as paper. The hopping roller 607 operates to take one sheet of the recording medium 506 at a time, and feed that recording medium 605 to the upper part.

Furthermore, a feeding roller 610 and a resist roller are arranged downstream of the hopping roller 607 in the feeding direction of the recording medium 605. The feeding roller 610 feeds a recording medium 605 by pinching the recording medium 605 with a pinch roller 608. The resist roller 611 pinches the recording medium 605 with a pinch roller 609, corrects the bowed filling of the recording medium 605, and feed it to the processing unit 601. The hopping roller 607, the feeding roller 610, and the resist roller 611 rotate using power transmitted via a gear etc. from a driving source (not shown).

A transfer roller is arranged in the location that counters each photoconductive drum of the processing units 601-604. The transfer roller 612 is respectively formed by semi-conductive rubber etc. and transfers the visual image of the toner adhered on the photoconductive drum 603a to the recording medium 605. When the transfer roller 612 transfers the visual image by the toner on the photoconductive drum 603a to the recording medium 605, an electric potential is applied to the surface electric potential of the photoconductor drums 601a-604a, and the surface electric potential of these each transfer roller 612 in order to make an electric potential difference.

A fusing device 613 has a heating roller and a backup roller, and fuses the toner transferred on the recording medium 605 by pressing and heating. Ejecting rollers 614 and 615 arranged downstream of the fusing device 613 pinch the recording medium 605 ejected from the fusing device 613 with pinch rollers 616 and 617 of a ejecting part, and feed it to a recording medium stacker part 618. The fusing device 613 and the ejecting roller 614 etc. are rotated by the power transmitted via a gear etc. from the driving source (not shown).

Next, the operation of the tandem color printer 600 of the configuration mentioned above is described. Initially, the recording medium 605 stored and deposited on the paper cassette 606 is fed by the hopping roller 607 separated one sheet at a time from the top. Then, the recording medium 605 is pinched by the feeding roller 610 and the pinch roller 608, and the resist roller 611 and the pinch roller 609, and is fed between the photoconductor drum 601a of the processing unit 601 of yellow and the transfer roller 612. Then, the recording medium 605 is pinched by the photoconductor drum 601a and the transfer roller 612 and a toner image is transferred on the recording surface, and at the same time, it is further fed by rotation of the photoconductor drum 601a in a downstream direction.

Similarly, the recording medium 605 passes through the processing units 602-604 one by one, the toner image of each color, that is developed by the electrostatic latent image formed by each exposing device 601c-604c by the developing devices 601d-604d, is transferred one by one onto the recording surface, and is piled up in the passing process. After the toner image of each color is piled up on the recording surface, the toner image is fused to the recording medium 605 with the fusing device 613, and the recording medium 605 after fusing is pinched by the ejecting roller 614 and the pinch roller 616, and the ejecting roller 615 and the pinch roller 617, and is ejected to the recording medium stacking part 618 outside the tandem color printer 600. A colored image is formed on the recording medium 605 through the above process.

As mentioned above, according to the image forming device of the present invention, since the optical print head that has a light-emitting thyristor as a light-emitting element is adopted, the high quality image forming devices (a printer, a copy machine, etc.) can be provided that is excellent in space efficiency and in optical extraction efficiency. That is, by using the optical print head of the first through third disclosed embodiments mentioned above, although the effect is obtained not only in the full color image forming device mentioned above but in monochrome and a multicolor image forming device, a much greater effect is obtained in the full color image forming device that requires especially many exposing devices.

As described above, although each embodiment described above describes the case of using the light-emitting thyristor used as a luminous source, the present invention can be applied also when performing a voltage application control to other elements connected at series to the switching element, for example, an organic electroluminescence (EL) element and a heating resistor. It can be used in the printer equipped with an organic EL head that consists of arrays of the organic EL element, and in a thermal printer that consists of sequences of the heating resistor, for example. Furthermore, the present invention is applicable also to the thyristor used as a switching element for driving (operation of a voltage application) the display element, for example, the display element that arranged seriate or matrix form. The present invention is also applicable in four terminal thyristor: (Silicon) Semiconductor Controlled Switch (SCS) equipped with the first and second of two gate terminals, besides a thyristor equipped with a three-terminal configuration.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A light-emitting element array, comprising:
    a plurality of light-emitting elements each including a switch element;
    a driving unit configured to drive the plurality of light-emitting elements to emit light by supplying a constant current; and
    a control circuit configured to control printing operations, wherein
    the switch element including
    first, second and third terminals, the first terminal being connected to the driving unit via a connecting member, the second terminal being connected to ground, and the third terminal being connected to the control circuit, and
    a resistor arranged between the first terminal and the connecting member.

2. The light-emitting element array of claim 1, wherein the resistor has a resistance value that is defined as a function of a characteristic impedance of the connecting member.

3. The light-emitting element array of claim 1, wherein the resistor has a resistance value that is between twice the characteristic impedance of the connecting member, and half of the characteristic impedance of the connecting member.

4. The light-emitting element array of claim 1, wherein the resistor is arranged in series directly between the first terminal and the connecting member.

5. A drive controlling circuit, comprising:
a switch element included in a light-emitting element;
a driving unit configured to provide a constant current to the light-emitting element, the driving unit being connected to the light-emitting element via a connecting member;
a control circuit configured to control the light-emitting element to emit light; and
a resistor, wherein
the switch element includes first, second and third terminals, the first terminal being connected to the driving unit via the connecting member, the second terminal being connected to ground, and the third terminal being connected to the control circuit,
the resistor is arranged between the first terminal and the connecting member, and the resistor being provided in the control circuit.

6. The drive controlling circuit of claim 5, wherein the resistor has a resistance value that is defined as a function of a characteristic impedance of the connecting member.

7. The drive controlling circuit of claim 6, wherein the resistor has a resistance value that is between twice the characteristic impedance of the connecting member, and half of the characteristic impedance of the connecting member.

8. The drive controlling circuit of claim 5, wherein the resistor has a middle point tap and the resistance value is adjustable.

9. The drive controlling circuit of claim 5, wherein the resistor is arranged directly in series between the first terminal and the connecting member.

10. A recording head, comprising:
a plurality of light-emitting elements, each of the plurality of light-emitting elements including a switch element having first, second and third terminals, each of the plurality of light-emitting elements being controlled by receiving a constant current from a driving unit connected via a connecting member;
a control circuit configured to provide a control signal at an output terminal, and
a resistor, wherein
the first terminal is connected to the driving unit via the connecting member,
the second terminal is connected to ground,
the third terminal is connected to the output terminal of the control circuit, and
the resistor is arranged between the first terminal and the connecting member.

11. The recording head of claim 10, wherein the resistor has a resistance value that is defined as a function of a characteristic impedance of the connecting member.

12. The recording head of claim 11, wherein the resistor has a resistance value that is between twice the characteristic impedance of the connecting member, and half of the characteristic impedance of the connecting member.

13. The recording head of claim 10, wherein the resistor and the control circuit are arranged on a single semiconductor chip.

14. The recording head of claim 10, wherein the resistor has a middle point tap and the resistance value is variable.

15. The recording head of claim 10, wherein the resistor is arranged directly in series between the first terminal and the connecting member.

16. An image forming device, comprising:
a plurality of light-emitting elements, each of the plurality of light-emitting elements including a switch element, each of the plurality of light-emitting elements being controlled by receiving a constant current from a driving unit connected via a connecting member; and
a resistor arranged between the plurality of light-emitting elements and the connecting member;
wherein each switch element includes
a first terminal connected to the driving unit via the connecting member and the resistor,
a second terminal connected to ground, and
a third terminal connected to a control circuit.

17. The image forming device of claim 16, wherein the resistor has a resistance value that is defined as a function of a characteristic impedance of the connecting member.

18. The image forming device of claim 17, wherein the resistor has a resistance value that is between twice the characteristic impedance of the connecting member, and half of the characteristic impedance of the connecting member.

19. The image forming device of claim 16, wherein the resistor and the control circuit are both provided on a single semiconductor chip.

20. The image forming device of claim 16, wherein the resistor has a middle point tap and the resistance value is variable.

21. The image forming device of claim 16, wherein the resistor is arranged directly in series between the plurality of light-emitting elements and the connecting member.

22. A printer circuit, comprising:
an optical print head, including
a resistor having a first end and a second end,
a plurality of light-emitting elements, each of the plurality of light-emitting elements including a switch element having a first terminal, a second terminal, and a third terminal, and
a control circuit;
a printer driving unit; and
a connecting cable connected between the printer driving unit and the first end of the resistor,
wherein the first terminal in each of the plurality of light-emitting elements is connected to the second end of the resistor,
wherein the second terminal in each of the plurality of light-emitting elements is connected to ground, and
wherein the third terminal in each of the plurality of light-emitting elements is connected to the control circuit.

23. The printer circuit of claim 22, wherein the resistor has a resistance value that is defined as a function of a characteristic impedance of the connecting member.

24. The printer circuit of claim 22, wherein the resistor and the control circuit are both provided on a single semiconductor chip.

25. The printer circuit of claim 22, wherein the printer driving unit is configured to drive the plurality of light-emitting elements to emit light by supplying a constant current.

* * * * *